(12) United States Patent
Park et al.

(10) Patent No.: US 11,332,870 B2
(45) Date of Patent: May 17, 2022

(54) LAUNDRY TREATING APPARATUS

(71) Applicant: LG ELECTRONICS INC., Seoul (KR)

(72) Inventors: Jonga Park, Seoul (KR); Kiyong An, Seoul (KR); Kihoon Choi, Seoul (KR); Minho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 16/918,806

(22) Filed: Jul. 1, 2020

(65) Prior Publication Data

US 2020/0332452 A1  Oct. 22, 2020

Related U.S. Application Data

(63) Continuation of application No. 15/643,779, filed on Jul. 7, 2017, now Pat. No. 10,760,194.

(30) Foreign Application Priority Data

Jul. 7, 2016  (KR) .................. 10-2016-0086343
Oct. 26, 2016  (KR) .................. 10-2016-0140290
Jun. 2, 2017  (KR) .................. 10-2017-0069026

(51) Int. Cl.
*D06F 37/22* (2006.01)
*D06F 37/20* (2006.01)
(Continued)

(52) U.S. Cl.
CPC ............ *D06F 37/225* (2013.01); *D06F 37/20* (2013.01); *D06F 37/22* (2013.01); *D06F 37/24* (2013.01);
(Continued)

(58) Field of Classification Search
CPC .......... D06F 37/20; D06F 37/22; D06F 37/24; D06F 37/225; D06F 37/245; D06F 39/12; D06F 58/04
See application file for complete search history.

(56) References Cited

U.S. PATENT DOCUMENTS 5,775,472 A   7/1998  Osterberg et al.
5,855,353 A   1/1999  Shaffer et al.
(Continued)

FOREIGN PATENT DOCUMENTS

CN   1165884    11/1997
CN   101314906  12/2008
(Continued)

OTHER PUBLICATIONS

Korean Office Action dated Apr. 10, 2021 issued in KR Application No. 10-2017-0069023.
(Continued)

*Primary Examiner* — Joseph L. Perrin
(74) *Attorney, Agent, or Firm* — Ked & Associates, LLP

(57) ABSTRACT

A laundry treating apparatus is provided. The laundry treating apparatus includes a cabinet, a drum accommodated in the cabinet, and a dynamic absorber provided to absorb oscillation of the cabinet. The dynamic absorber includes a first moving mass movably provided on the support plate to absorb oscillation transmitted to the cabinet and a second moving mass movably provided on the support plate to absorb oscillation transmitted to the cabinet. Each of the first and second moving masses includes a single mass made of a metal material or a mass in which a plurality of thin metal plates are coupled to overlap each other, and the first moving mass has a mass greater than that of the second moving mass.

20 Claims, 26 Drawing Sheets

(51) Int. Cl.
*D06F 37/24* (2006.01)
*D06F 39/12* (2006.01)
*D06F 58/04* (2006.01)
*F16F 15/08* (2006.01)

(52) U.S. Cl.
CPC .............. *D06F 58/04* (2013.01); *D06F 39/12* (2013.01); *F16F 15/08* (2013.01); *F16F 2234/06* (2013.01)

(56) References Cited

U.S. PATENT DOCUMENTS

| | | | |
|---|---|---|---|
| 5,924,312 | A | 7/1999 | Vande Haar |
| 5,946,947 | A | 9/1999 | Lee et al. |
| 8,443,636 | B2 | 5/2013 | Galassi et al. |
| 2004/0173426 | A1 | 9/2004 | Athanasiou |
| 2004/0263032 | A1 | 12/2004 | Cho |
| 2006/0000245 | A1 | 1/2006 | Won et al. |
| 2006/0117812 | A1 | 6/2006 | Wee |
| 2008/0178634 | A1 | 7/2008 | Kim et al. |
| 2008/0295545 | A1 | 12/2008 | Kim et al. |
| 2009/0151398 | A1 | 6/2009 | Fang et al. |
| 2010/0024491 | A1 | 2/2010 | Galassi et al. |
| 2013/0043101 | A1 | 2/2013 | Takahashi et al. |
| 2013/0118211 | A1 | 5/2013 | Chang et al. |

FOREIGN PATENT DOCUMENTS

| | | |
|---|---|---|
| CN | 101529006 | 9/2009 |
| CN | 102883921 | 1/2013 |
| CN | 103103718 | 5/2013 |
| JP | H05-059843 | 3/1993 |
| JP | 2001-254775 | 9/2001 |
| JP | 2003-176641 | 6/2003 |
| JP | 2010-194023 | 9/2010 |
| JP | 2010-194024 | 9/2010 |
| JP | 2015-154879 | 8/2015 |
| JP | 2015-154880 | 8/2015 |
| KR | 10-1999-0065041 | 8/1999 |
| KR | 10-2006-0001241 | 1/2006 |
| KR | 10-2006-0004502 | 1/2006 |
| KR | 10-0782988 | 12/2007 |
| KR | 10-0798780 | 1/2008 |
| KR | 10-2012-0106245 | 9/2012 |
| KR | 10-2013-0052071 | 5/2013 |

OTHER PUBLICATIONS

Korean Office Action dated Apr. 10, 2021 issued in KR Application No. 10-2017-0069024.
Korean Office Action dated Apr. 15, 2021 issued in KR Application No. 10-2017-0069026.
European Search Report dated Oct. 13, 2017 issued in Application No. 17179986.9.
PCT International Search Report (with English Translation) dated Sep. 19, 2017 issued in Application No. PCT/KR2017/006044.
United States Office Action dated Feb. 25, 2019 issued in co-pending related U.S. Appl. No. 15/643,545.
Machine Translation of JP 2010-194023A to Panasonic (Year: 2009).
U.S. Office Action dated May 6, 2019 issued in U.S. Appl. No. 15/643,662.
Chinese Office Action dated Apr. 30, 2019 issued in CN Application No. 201710546280.X.
Machine Translation of KR 10-2013-0052071A to Samsung (Year: 2013).
Machine Translation of JP 2010-194023A to Panasonic (Year: 2010).
Chinese Office Action dated May 28, 2019 issued in CN Application No. 201710546898.6.
Chinese Office Action dated Jul. 17, 2019 issued in Application No. 201710546291.8 (with English Translation).
Japanese Office Action dated Mar. 24, 2020 issued in JP Application No. 2019-500394.

LAUNDRY TREATING APPARATUS

CROSS-REFERENCE TO RELATED APPLICATIONS

The present application is a Continuation Application of U.S. application Ser. No. 15/643,779 filed on Jul. 7, 2017, which claims priority under 35 U.S.C. 119 and 35 U.S.C. 365 to Korean Patent Application Nos. 10-2016-0086343 filed on Jul. 7, 2016, 10-2016-0140290 filed on Oct. 26, 2016, and 10-2017-0069026 filed Jun. 2, 2017, which are hereby incorporated by reference in their entireties.

BACKGROUND

1. Field

The present disclosure relates to a laundry treating apparatus.

2. Background

In the case of home appliance provided with a rotating drum such as a washing machine or a dryer, as the rotational speed (rpm) of the drum increases, horizontal excitation force is generated by eccentricity of laundry put into the drum, i.e., a load. Particularly, in the dehydration process, transient oscillation (damped oscillation (vibration)) in which horizontal oscillation displacement of a cabinet of the washing machine rapidly increases at a resonant frequency point of the cabinet of the washing machine occurs while the rotational speed of the drum increases. Also, when the drum is constantly maintained at the maximum speed, continuous oscillation (steady-state oscillation (vibration)) in which the same oscillation is constantly repeated occurs.

The transient oscillation causes a phenomenon in which the washing machine is wobbled in a lateral direction while the rotational speed of the drum increases. Also, the transient oscillation is more pronounced in a stack type washing machine in which the washing machine is spaced apart from the ground. For example, in the case of a compact washing machine or the stack type washing machine that is stacked on a top surface of an object for storing laundry, the oscillation displacement of the transient oscillation is larger than that of a general washing machine that is placed directly on an installation surface, and the transient oscillation occurs at a low speed operation. That is, a time point at which the transient oscillation occurs is accelerated in the stack type washing machine when compared to a washing machine that is placed directly on the floor.

To absorb the transient oscillation, a dynamic absorber is generally installed in the washing machine. The dynamic absorber may be a dynamic absorber using a principle of absorbing the oscillation of the washing machine by oscillating in a horizontal direction in a phase opposite to that of the horizontal excitation force generated by the rotation of the drum by about 180 degrees.

In detail, when the rotation of the drum is accelerated, the horizontal excitation force is generated by rotation of the eccentric load (laundry) as described above. Also, when the number of revolutions of the drum increases to reach the resonant frequency of the drum, the cabinet of the washing machine harmonically oscillates at a resonant point in a phase difference of about 90 degrees with respect to the excitation force.

Also, the dynamic absorber harmonically oscillates at the resonant point in a phase difference of about 90 degrees with respect to the oscillation of the cabinet of the washing machine. As a result, the excitation force and the dynamic absorber oscillate in a phase difference of about 180 degrees therebetween in opposite directions to offset the oscillation, thereby the cabinet of the washing machine from moving.

A technique in which the dynamic absorber is provided in a washing machine is disclosed in U.S. Pat. No. 8,443,636. The disclosed dynamic absorber has a structure in which a frame is provided on a bottom surface of a casing of a washing machine, a viscoelastic member is provided on a top surface of the frame, and a moving mass for absorbing oscillation is provided on a top surface of the viscoelastic member.

The disclosed dynamic absorber has limitations as follows. First, since the viscoelastic member is provided on a bottom surface of the moving mass, a load of the moving mass may continuously act on the viscoelastic member to cause damage and performance deterioration of the viscoelastic member. Second, when the moving mass oscillates horizontally, since the viscoelastic member absorbs the oscillation by using shear stress acting in the lateral direction, there is a limitation that transient oscillation is not effectively absorbed due to a low damping ratio. Although the feature in which the oscillation is effectively absorbed in the entire range of the number of revolutions of the drum is disclosed, the disclosed dynamic absorber may have an effect of absorbing continuous oscillation, but the capability to absorb transient oscillation with suddenly increasing oscillation displacement may be significantly reduced.

Third, since the share stress alternately acts on the viscoelastic member, there is a disadvantage that possibility of damage of the viscoelastic member increases, and the lifespan of the viscoelastic member is shortened. Fourth, when the horizontal oscillation is applied to the washing machine, and thus, the moving mass moves horizontally in a direction opposite to the oscillation, and viscoelastic member is bent while an upper end of the viscoelastic member moves in the lateral direction. As a result, there is a limitation that the moving mass is not shaken in the lateral direction while maintaining the horizontal state so as to absorb the oscillation. That is to say, when the moving mass is shaken in the lateral direction to absorb transverse oscillation, left and right ends of the moving mass are tilted downward due to the bending of the viscoelastic member. As a result, the horizontal oscillation acting on the washing machine may not be effectively absorbed.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Hereinafter, a laundry treating apparatus according to an embodiment will be described in detail with reference to the accompanying drawings.

First, the terms described in this specification will be defined. The transient (damped) oscillation (vibration), which will be described below, is defined as oscillation in which, when a drum into which laundry is put rotates to be accelerated for rinse or dehydration, oscillation displacement of a cabinet rapidly increases at a resonant point of the drum. Also, continuous (steady-state) oscillation (vibration), which will be described below, is defined as oscillation that is continuously generated with almost constant oscillation displacement while the drum is maintained at the maximum speed. Also, the improvement or the absorption of the transient oscillation or the continuous oscillation by the dynamic absorber according to an embodiment may be understood as a phenomenon in which the dynamic absorber removes or minimizes the transient oscillation or the continuous oscillation to minimize the oscillation of the cabinet.

Figure 1:
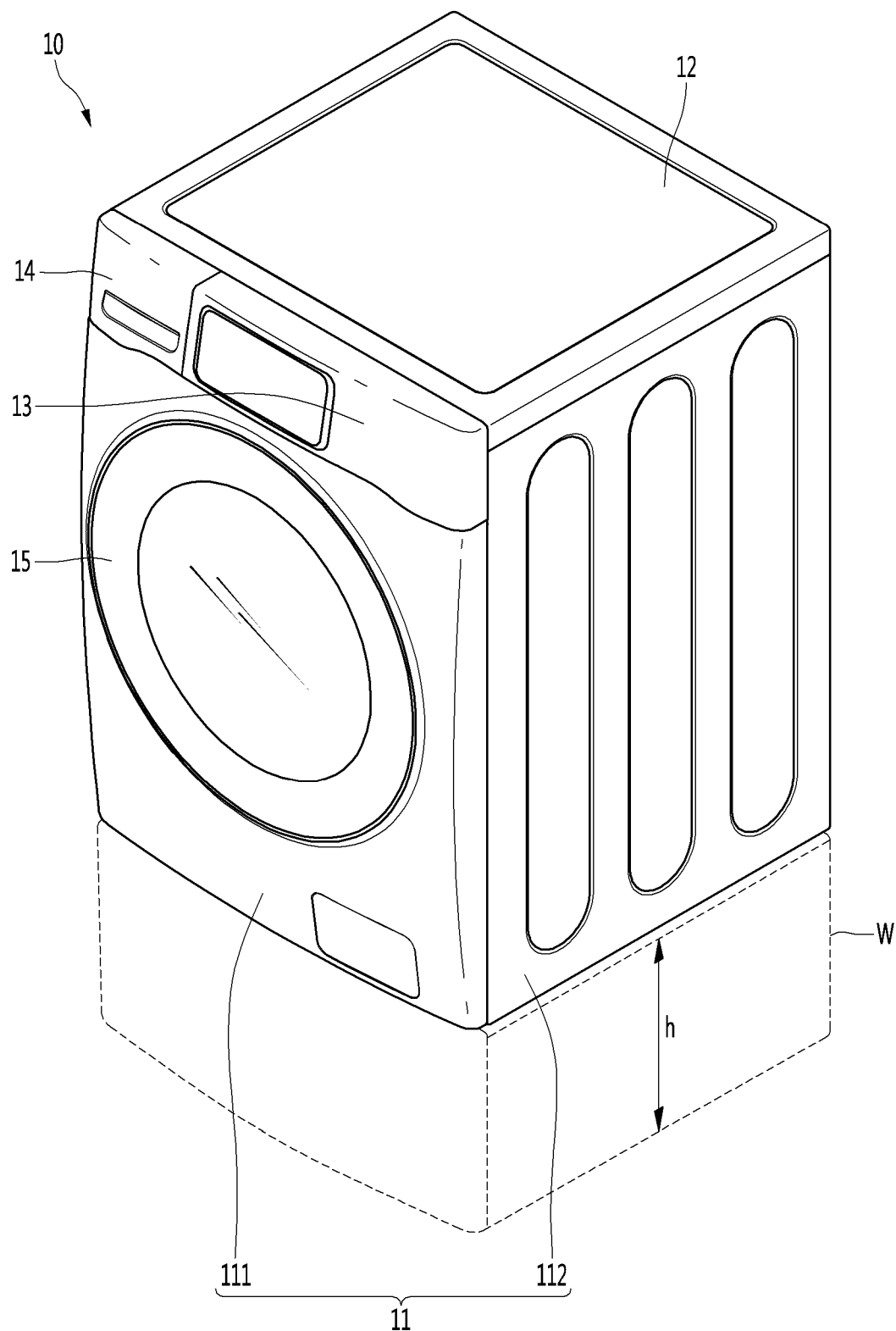
FIG. 1 is a perspective view of a laundry treating apparatus according to an embodiment.
Figure 2:
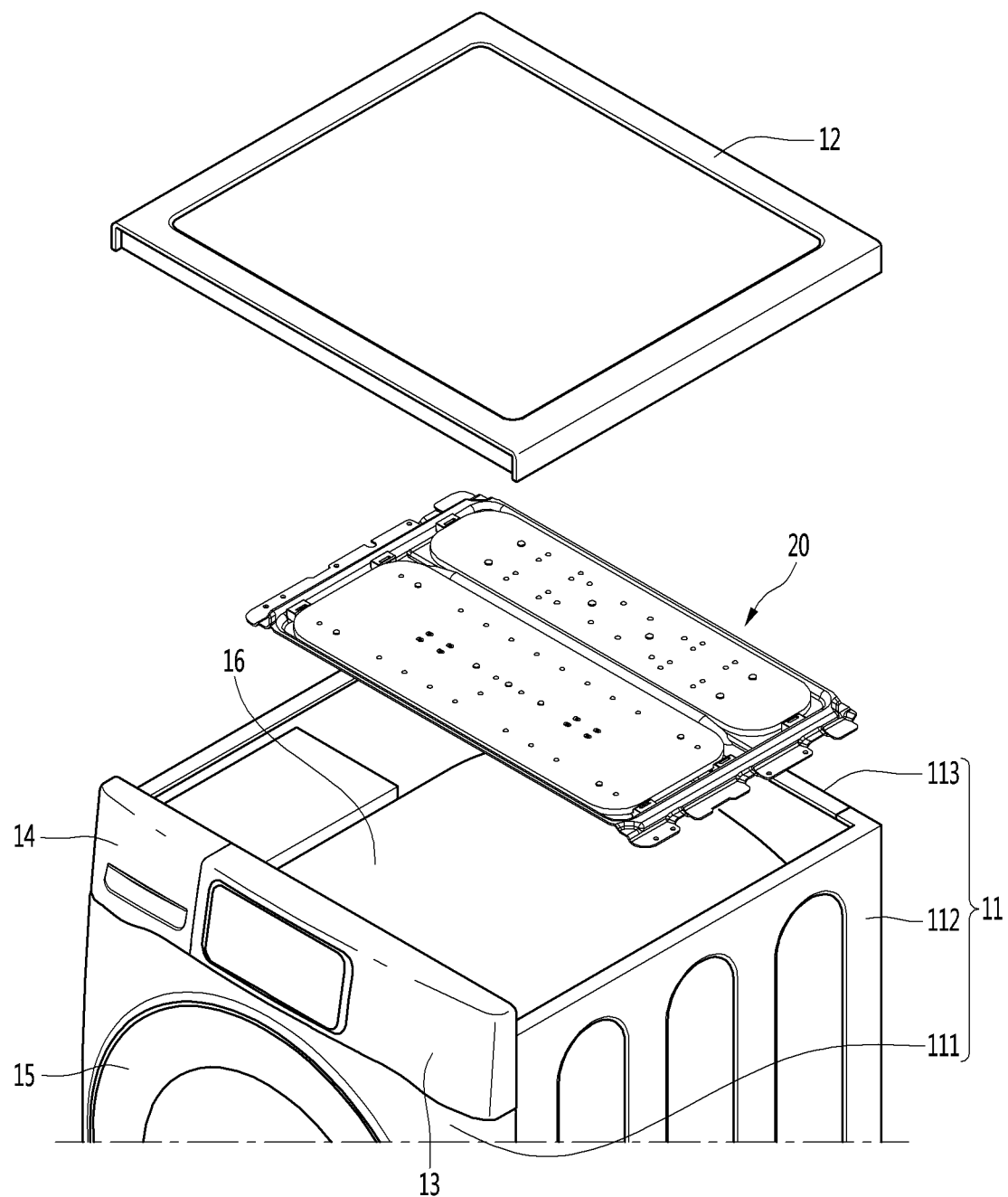
FIG. 2 is an exploded perspective view of the laundry treating apparatus including a dynamic absorber according to an embodiment.

FIG. 1 is a perspective view of a laundry treating apparatus according to an embodiment, and FIG. 2 is an exploded perspective view of the laundry treating apparatus including a dynamic absorber according to an embodiment. Referring to FIGS. 1 and 2, a laundry treating apparatus 10 according to an embodiment may include a cabinet 11, a dynamic absorber (also referred to as a dynamic dampener or vibration dampener) 20 provided on a top surface of the cabinet 11 to absorb oscillation transmitted to the cabinet 11, a drum (not shown) accommodated in the cabinet 11, and a tub 16 accommodating the drum.

In detail, the cabinet 11 includes a front cabinet 111, side cabinets 112, and a rear cabinet 113. A top plate 12 is placed on a top surface of the cabinet 11 to cover an upper opening of the cabinet 11. Also, a door 15 is rotatably coupled to the front cabinet 111 so that laundry is put into the drum. Also, a detergent box 14 and a control panel 13 may be provided on an upper end of the front cabinet 111.

Also, the laundry treating apparatus 10 may be provided directly on an installation surface or provided on a separate stacking body W having a predetermined height h. The separate stacking body W may be an independent washing machine having a small volume or a storage box for storing objects including the laundry, but is not limited thereto.

The dynamic absorber according to an embodiment is seated on the top surface of the cabinet 11 and covered by the top plate 12 so that the dynamic absorber 20 is not exposed to the outside. Also, left and right ends of the dynamic absorber 20 are seated on upper ends of the left and right side cabinets 112, respectively. Also, since the detergent box 14 and the control panel 13 are provided in an inner upper portion of the cabinet 11, the dynamic absorber 20 may be provided to be spaced backward from a front end of the cabinet 11 so that the dynamic absorber 20 does not interfere with the detergent box 14 and the control panel 13.

For example, a horizontal distance between a front end of a support plate (or support) 21 (see FIGS. 3 and 4) and the front cabinet 111 may be set to be greater than that between a rear end of the support plate 21 and the rear cabinet 113. However, an embodiment of the present disclosure is not limited thereto. For example, the dynamic absorber 20 may be provided at a center of the top surface of the cabinet 11.

Figure 3:
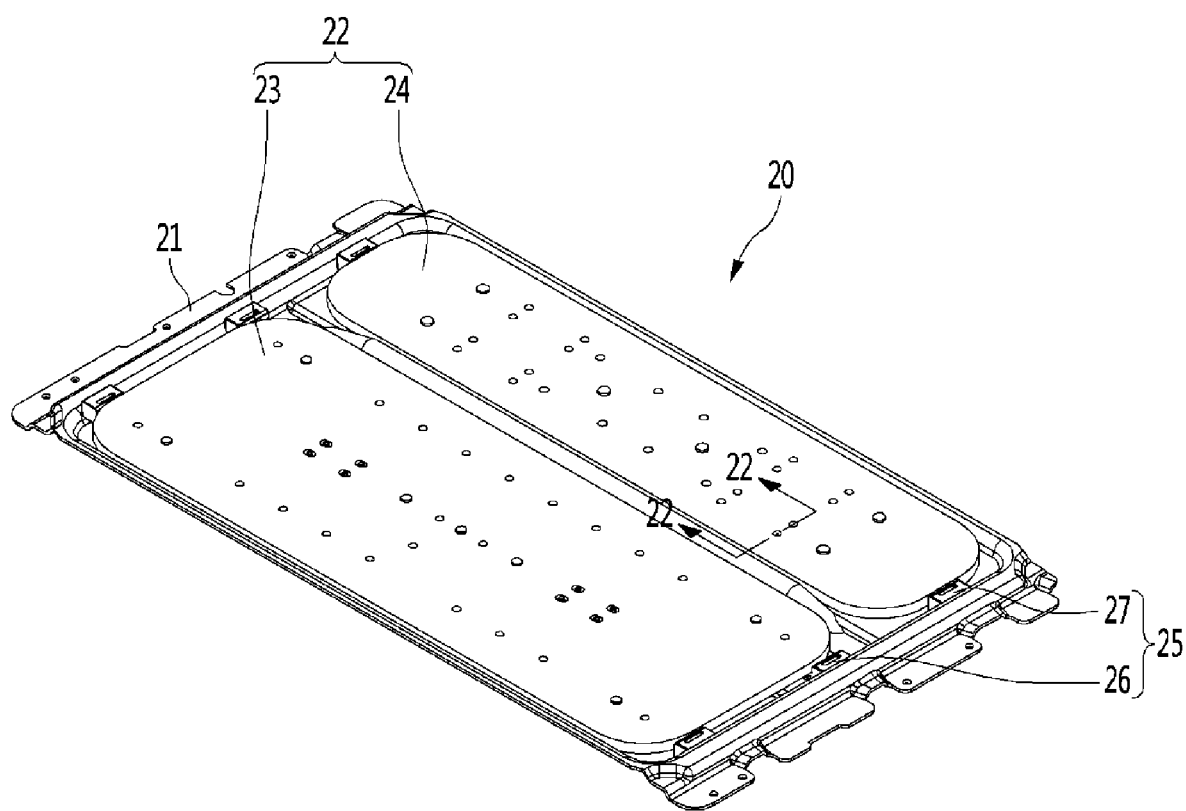
FIG. 3 is a perspective view of the dynamic absorber according to an embodiment.
Figure 4:
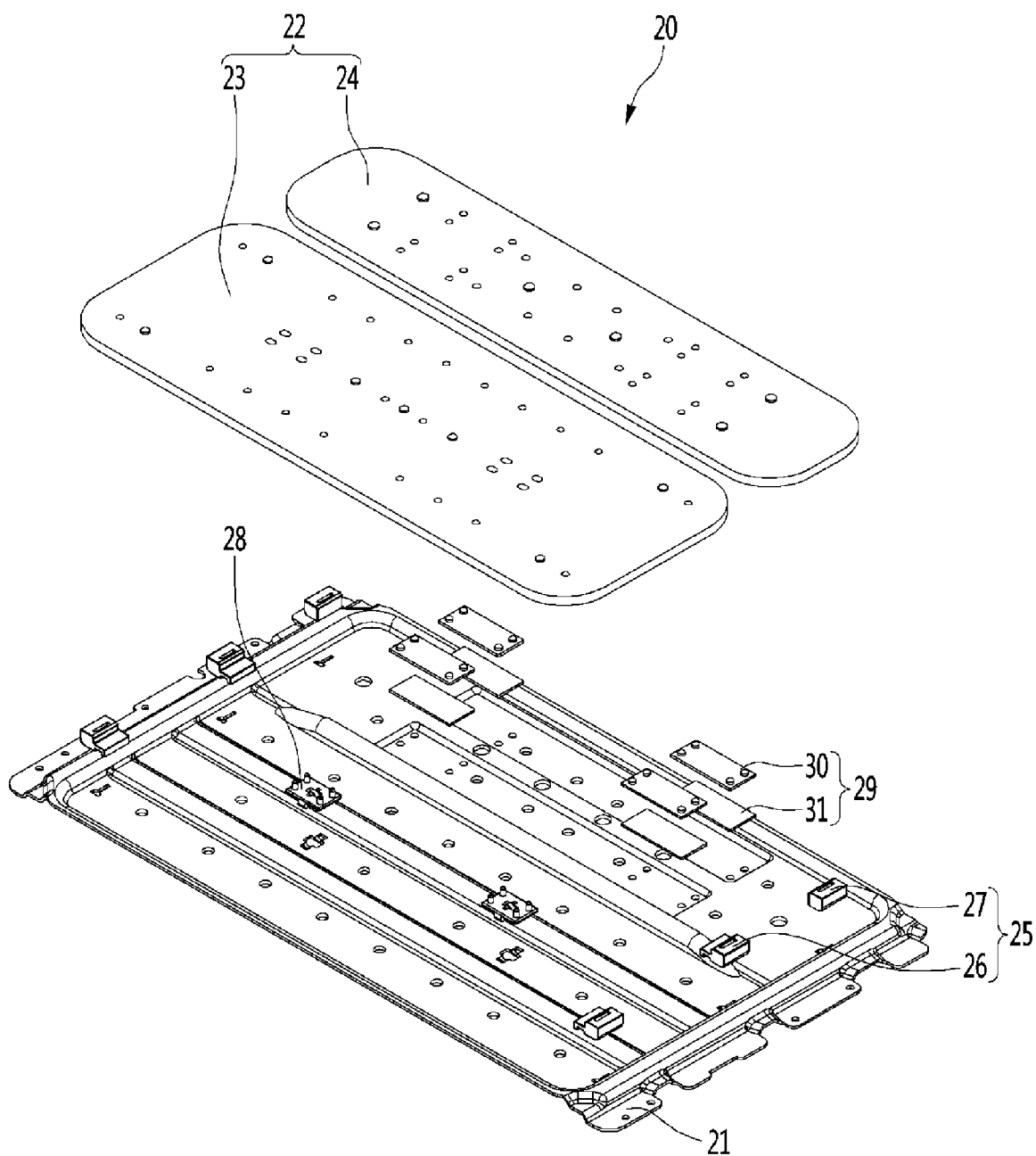
FIG. 4 is an exploded perspective view of the dynamic absorber.

Hereinafter, a structure and function of the dynamic absorber 20 will be described in detail with reference to the accompanying drawings. FIG. 3 is a perspective view of the dynamic absorber according to an embodiment, and FIG. 4 is an exploded perspective view of the dynamic absorber. Referring to FIGS. 3 and 4, the dynamic absorber 20 according to an embodiment may include a support plate 21, a moving mass (also referred to as a mass or mass body) 22 slidably provided on the support plate, an elastic damper 25 provided on a side surface of the moving mass 22, and a sliding guide member supporting a bottom surface of the moving mass 22.

In detail, the moving mass 22 is slidably provided on the support plate 21 in a horizontal direction, i.e., a lateral direction of the laundry treating apparatus 10. Also, the moving mass 22 may include a first moving mass (or first mass body) 23 and a second moving mass (or second mass body) 24 provided at a rear side of the first moving mass 23. Here, it is noted that the front moving mass may be defined as the second moving mass, and the rear moving mass may be defined as the first moving mass.

Also, one of the first and second moving masses 23 and 24 may be a damper for absorbing the transient oscillation of the cabinet 11, and the other may be a damper for absorbing the continuous oscillation of the cabinet 11. Also, the damper for absorbing the transient oscillation may be provided at the front or the rear of the damper for absorbing the continuous oscillation. In this embodiment, the first front moving mass 23 may be the damper for reducing the continuous oscillation, and the second rear moving mass 24 may be the damper for reducing the transient oscillation. Also, the damper for reducing the continuous oscillation may have a mass greater than that of the damper for reducing the transient oscillation. This is because the continuous oscillation is generated at high-speed rotation, and the transient oscillation is generated at low-speed rotation that is relatively less than that of the continuous oscillation.

Also, the elastic damper 25 may include a first elastic damper 26 supporting both side surfaces of the first moving mass 23 and a second elastic damper 27 supporting both side surfaces of the second moving mass 24. The elastic damper 25 is made of a material having predetermined elasticity and attenuation to absorb an impact generated when the moving mass 22 moves in the lateral direction in a phase opposite to that of excitation force of the drum. That is, the elastic damper 25 may prevent the moving mass 22 from directly colliding with the side surface of the support plate 21 and push the moving mass 22 by using the elasticity in an opposite direction.

The sliding guide member includes a support (or s support body) 28 and a slider (also referred to as a slider plate or a friction plate) 29. In detail, the support 28 is provided on the bottom surface of the damper for reducing the continuous oscillation, and the slider 29 is provided on the bottom surface of the damper for reducing the transient oscillation. Thus, in this embodiment, the support 28 may be provided below the first moving mass 23, and the slider 29 may be provided below the second moving mass 24. Here, to improve the continuous oscillation, it is advantageous that the attenuation of the moving mass is small, and to improve the transient oscillation, it is advantageous that the attenuation of the moving mass is large. Thus, the attenuation of the support 28 may be designed to be minimized, and the attenuation of the slider 29 may be designed to be significantly larger than that of the support 28. Thus, the attenuation may be adequately determined in consideration of the resonant frequency generated in the transient oscillation and the mass of the second moving mass 24. In one embodiment depicted in FIG. 4, no supports 28 are present under second moving mass 24, and no sliders 27 are present under first moving mass 23.

Figure 5:
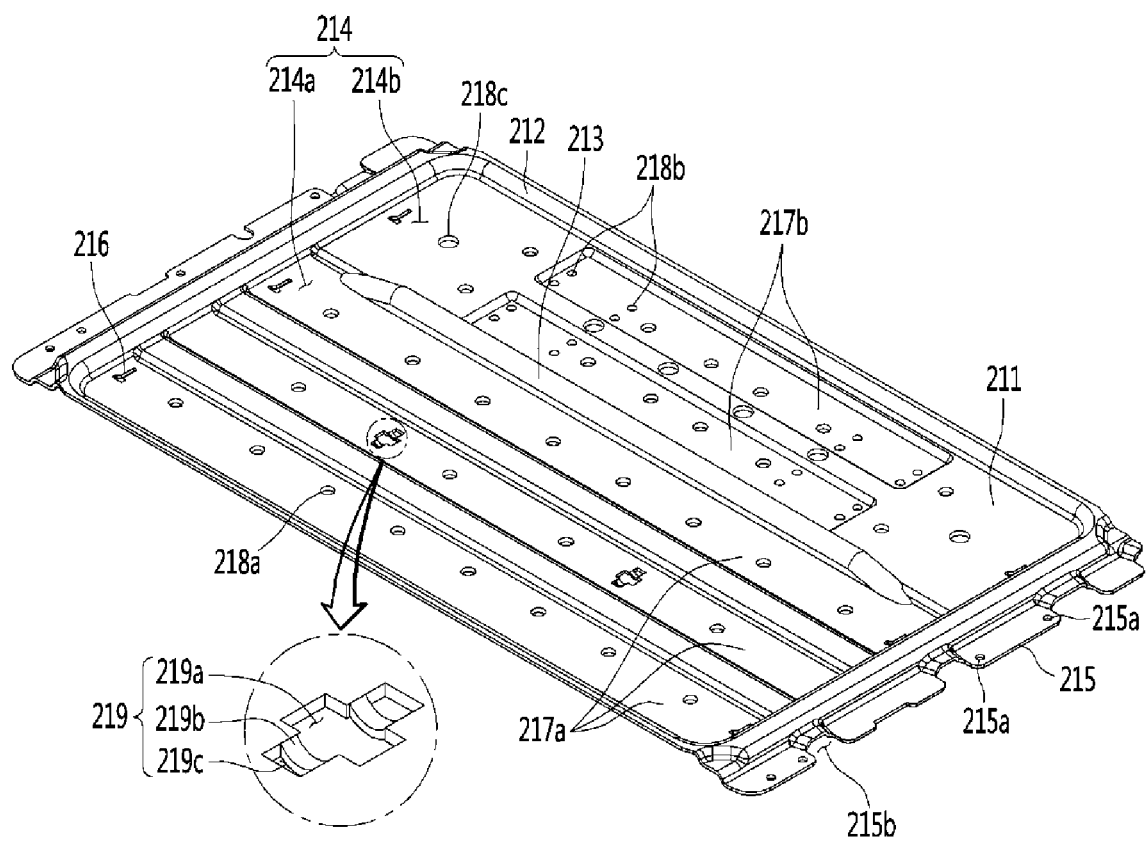
FIG. 5 is a perspective view of a support plate constituting the dynamic absorber according to an embodiment.
Figure 6:
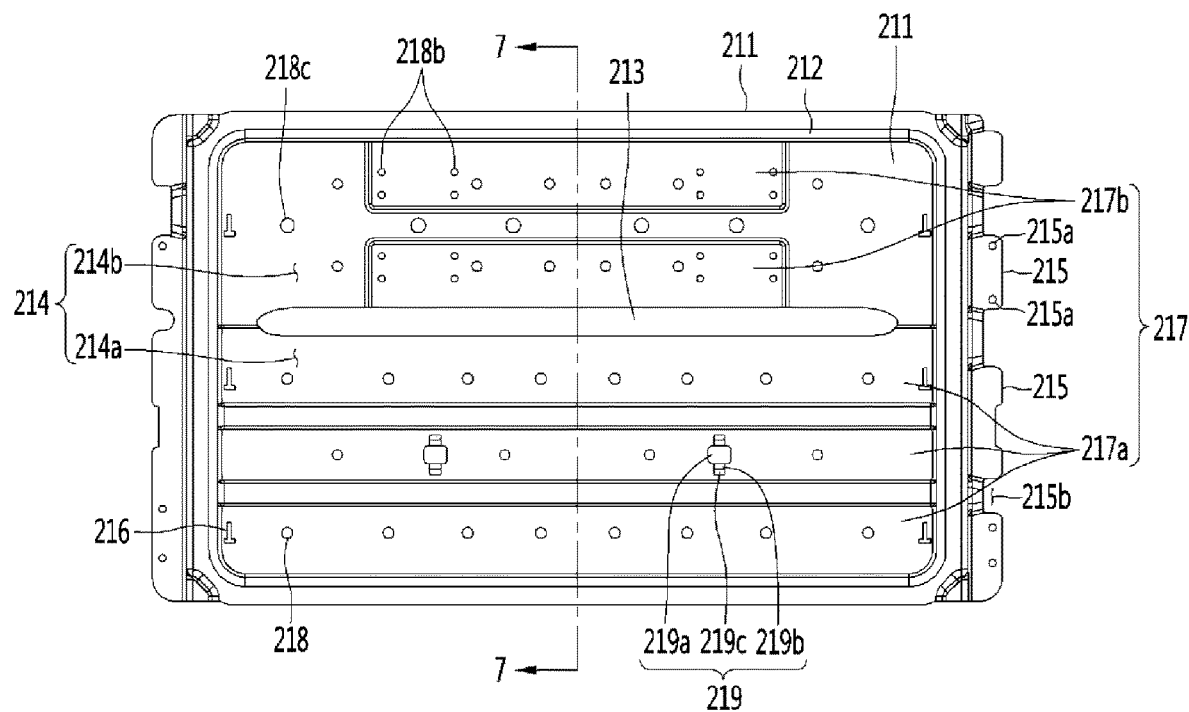
FIG. 6 is a plan view of the support plate.
Figure 7:
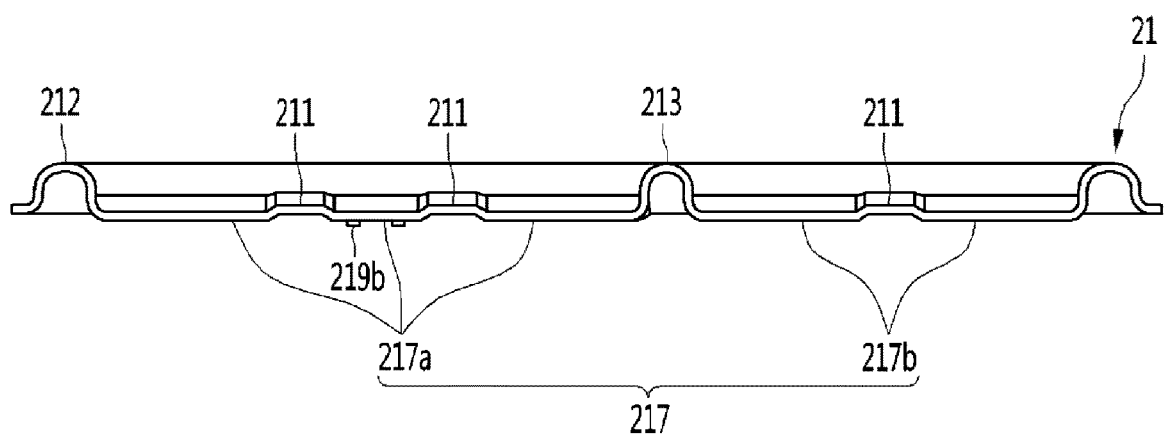
FIG. 7 is a longitudinal cross-sectional view taken along line 7-7 of FIG. 6.

Hereinafter, each of components constituting the dynamic absorber 20 will be described in detail with reference to the accompanying drawings. FIG. 5 is a perspective view of the support plate constituting the dynamic absorber according to an embodiment, FIG. 6 is a plan view of the support plate, and FIG. 7 is a longitudinal cross-sectional view taken along line 7-7 of FIG. 6. Referring to FIGS. 5 to 7, the support plate 21 constituting the dynamic absorber 20 according to an embodiment may be a support member supporting the moving mass 22, and the moving mass 22 may be provided to be slidable and movable in the lateral direction on the support plate 21.

In detail, the support plate 21 may include a plate body 211 provided as a rectangular metal plate, a boundary wall 212 surrounded in an approximately rectangular shape at an outer edge of the plate body 211, a partition wall 213 extending by a predetermined length from the inside of the boundary wall 212, and a cabinet coupling part (or tab) 215 extending from an outer edge of the boundary wall 212 and seated on the top surfaces of the side cabinets 112.

In more detail, the boundary wall 212 and the partition wall 213 may protrude by a predetermined height forward from a top surface of the plate body 211 through a forming process to reinforce rigidity of the support plate 21. Also, a moving mass accommodation part 214 accommodating the moving mass 22 is provided inside the boundary wall 212. Each of the boundary wall 212 and the partition wall 213 may protrude by a height of about 1 mm to about 15 mm. However, an embodiment of the present disclosure is not limited thereto. For example, it is sufficient if each of the boundary wall 212 and the partition wall 213 protrude by a height that is greater than a thickness of at least the moving mass 22.

Also, the partition wall 213 may partition the moving mass accommodation part 214 into a first front accommodation part 214a and a second rear accommodation part 214b. Each of left and right ends of the partition wall 213 may extend up to an inner edge of the boundary wall 212. As illustrated in the drawings, both the ends may be spaced a predetermined distance from each other from the inner edge of the boundary wall 212. Also, in this embodiment, since the first moving mass 23 has a mass (or weight) greater than that of the second moving mass 24, the partition wall 213 may be provided closer to a rear end than a front end of the boundary wall 212.

The cabinet coupling part 215 may be provided in plurality at left and right edges of the plate body 211. Also, one or plurality of coupling holes 215a may be defined in each of the cabinet coupling part 215. Also, a coupling member such as a screw may pass through the coupling hole 215a and then be inserted into each of the top surfaces of the side cabinets 112. Also, an avoiding groove 215b may be defined between the cabinet coupling parts 215 adjacent to each other in a front and rear direction. The avoiding groove 215b may be defined to prevent an object such as a ground line or a bolt head, which is coupled to the top surface of the side cabinet 112, from interfering with the support plate 21.

Also, a plurality of rigidity reinforcement parts 217 are provided on a portion of the plate body 211, which corresponds to the moving mass accommodation part 214. Each of the plurality of rigidity reinforcement parts 217 may be recessed by a predetermined depth downward from a bottom surface of the plate body 211 through a forming process. Also, the plurality of rigidity reinforcement parts 217 may be spaced a predetermined distance from each other in the front and rear direction.

In detail, the plurality of rigidity reinforcement parts 217 may include a plurality of forming parts 217a (or first rigidity reinforcement parts) provided in an area of the first accommodation part 214a and a plurality of second forming parts 217b (or second rigidity reinforcement parts) provided in an area of the second accommodation part 214b. Also, left and right edges of the plurality of first forming parts 217a may be connected to the inner edge of the boundary wall 212, and a front end of the frontmost forming part of the plurality of first forming parts 217a may be connected to the inner edge of the boundary wall 212.

Also, each of left and right edges of the plurality of second forming parts 217b may be spaced a predetermined distance from the inner edge of the boundary wall 212. Also, a front end of the frontmost forming part of the plurality of second forming parts 217b may be connected to the partition wall 213. Also, a rear end of the frontmost forming part of the plurality of second forming parts 217b may be connected to the inner edge of the boundary wall 212.

Also, a plurality of avoiding holes 218a may be defined in the plurality of rigidity reinforcement parts 217. The plurality of avoiding holes 218a may be holes for preventing interference with a head of the coupling member protruding from the bottom surface of the moving mass 22, e.g., a head of the rivet. Also, since the moving mass 22 moves in the lateral direction, each of the avoiding holes 218a may have an oval or long-hole shape having a long side corresponding to a moving distance (displacement) of the moving mass 22. Also, one or plurality of drain holes may be defined in the plate body 211 corresponding to the moving mass accommodation part 214 to quickly discharge moisture generated in the dynamic absorber to the outside.

Also, a support mounting part 219 may be provided on one of the plurality of first forming parts 217a. A formation position of the support mounting part 219 may be determined according to the mounted position of the support 28. In this embodiment, two support mounting parts 219 are provided to be spaced apart from each other in the lateral direction of the support plate 21.

The support mounting part 219 may include a roller hole 219a, a pair of hook holes 219c respectively defined in front and rear sides of the roller hole 219a, and a pair of roller shaft support parts 219b provided between the roller hole 219a and the hook holes 219c. Also, a plurality of slider coupling holes 218b may be defined in the second forming part 217b. The slider coupling holes 218b may be holes for allowing the slider 29 to be fixed to the support plate 21.

A plurality of coupling slits 216 may be respectively defined in left and right edges of the moving mass accommodation part 214. In detail, the plurality of coupling slits 216 may be defined at points adjacent to the inner edge of the boundary wall 212 so that the plurality of elastic dampers 25 are coupled to be fitted into the plurality of coupling slits 216. Each of the plurality of coupling slits 216 may have a T shape or I shape having a long side and a short side extending from an end of the long side in a direction crossing the long side. Since the coupling slit 216 has the T shape or I shape, a coupling arm (that will be described later) protruding from the bottom surface of the elastic damper 25 may be easily inserted. A method for inserting the coupling arm of the elastic damper 215 into the coupling slit will be described below with reference to the accompanying drawing.

Also, since the support plate 21 is fixed to the top surface of the side cabinet 112, oscillation of the cabinet 11 may be transmitted to the support plate 21, and thus, the support plate 21 may oscillate together with the cabinet 11.

Here, the support plate 21 may have a primary mode resonant frequency greater than a maximum rotating frequency of the drum to avoid a self-resonance of the support plate 21 within a rotation section of the drum. For example, the support plate 21 may have a primary mode natural frequency (or a primary mode resonant frequency) of about 20 Hz to about 30 Hz.

Figure 8:
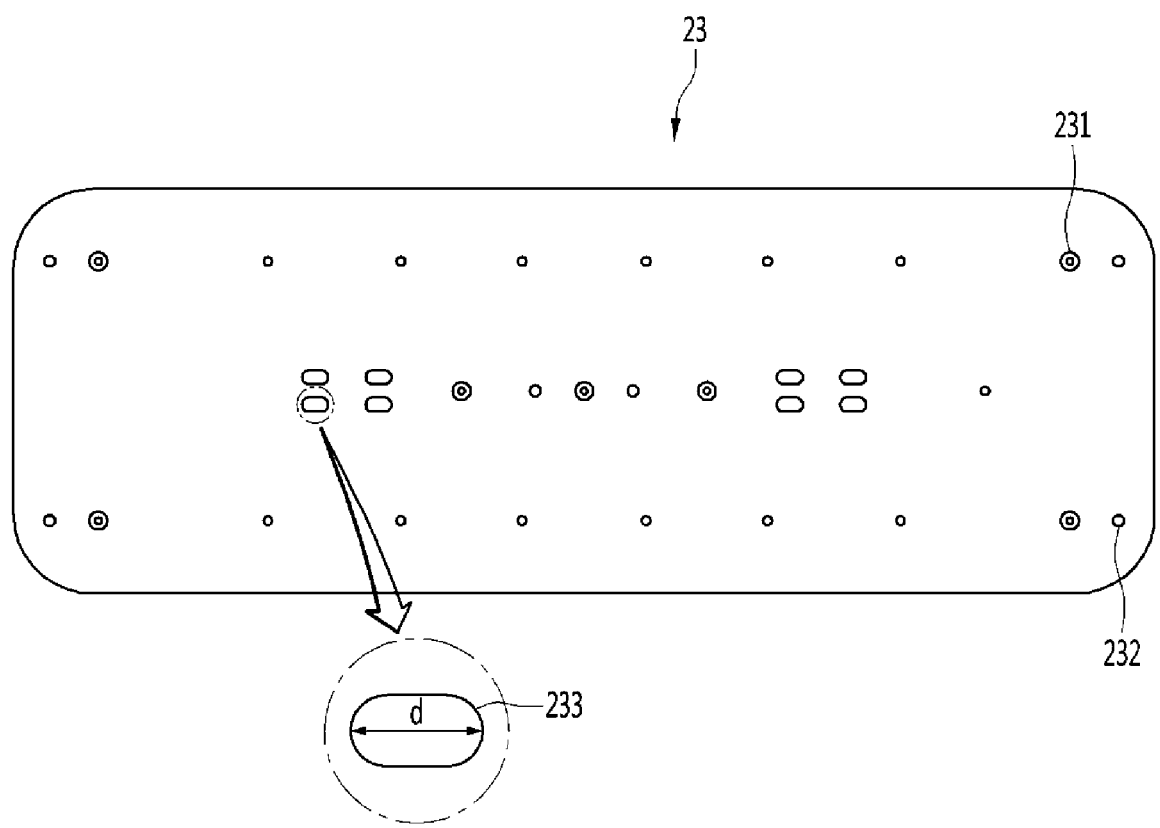
FIG. 8 is a plan view of a first moving mass according to an embodiment.
Figure 9:
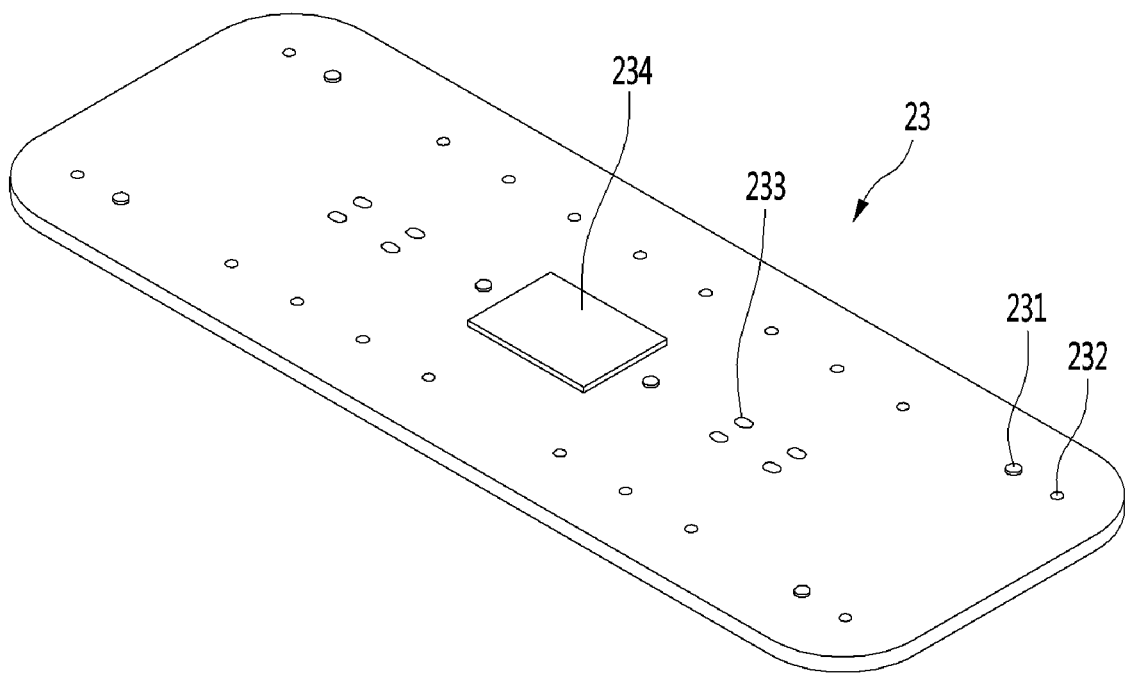
FIG. 9 is a perspective view of the first moving mass.

FIG. 8 is a plan view of the first moving mass according to an embodiment, FIG. 9 is a perspective view of the first moving mass. Referring to FIGS. 8 and 9, the first moving mass 23, which absorbs the continuous oscillation, of the moving mass 22 according to an embodiment may have a rectangular shape having rounded corners. In detail, the first moving mass 23 may be made of a metal material having high density to secure a sufficient mass in a limited space of the inside of the cabinet 11. Also, the first moving mass 23 may be a single mass manufacture through casting or be manufactured by laminating a plurality of thin metal plates.

When the first moving mass 23 is manufactured by laminating the plurality of thin metal plates, the plurality of thin metal plates may be coupled by a rivet part 231 to form a single body. Also, although the four corners of the moving mass 22 are rounded, an embodiment of the present disclosure is not limited thereto. Also, the number of rivet parts 231 may be adequately set according to the number and size of the thin metal plates to be laminated so that the plurality of thin metal plates functions like the single mass without being shaken or frictionized with each other.

Also, a plurality of guide hole units may be defined in a central portion of the first moving mass 23. Also, each of the guide hole units may include a plurality of holes 233. The plurality of guide hole units may be defined in a line defined by bisecting the first moving mass 23 in the front and rear direction or defined in left and right positions symmetrical to each other with respect to the line defined by bisecting the first moving mass 23 in the lateral direction.

The guide hole units may be portions on which the support 28 that will be described later in detail is mounted. Thus, the first moving mass 23 may stably move while being maintained in a horizontal state by the support 28. A single guide hole unit may be defined in a center of the moving mass 23. In this case, the first moving mass 23 may be vertically tilted while being reciprocated in the lateral direction to interfere with the support plate 21. Thus, at least two guide hole units may be provided. In this embodiment, the two guide hole units are defined in left and right sides of the moving mass 23.

Each of the guide holes 233 constituting the guide hole holes may have a long hole shape with a long side and a short side. The long side of the guide hole 233 has a length d corresponding to the moving displacement of the moving mass 23. That is, when the horizontal oscillation is transmitted to the cabinet 11, the first moving mass 23 may be shaken by a length of the guide hole 233 in the lateral direction.

Although the first moving mass 23 is horizontally shaken in the lateral direction, the first moving mass 23 may slightly oscillate in the vertical direction. When the vertical oscillation is transmitted to the first moving mass 23, the top surface of the first moving mass 23 may collide with the top plate 12 to cause noise. To prevent this phenomenon from occurring, a buffer pad 234 may be separately attached to the top surface of the first moving mass 23.

The buffer pad 234 may also be attached to the bottom surface of the first moving mass 23 to prevent a phenomenon in which a middle portion of the first moving mass 23 droops by a load from occurring or prevent the moving mass 23 from directly collide with the support plate 21 by the vertical oscillation acting on the first moving mass 23. The buffer pad 234 may include a nonwoven fabric, a viscoelastic member, silicon, or the like. It is noted that buffer pad 234 may be mounted on at least one surface of top and bottom surfaces of the second moving mass 23 that will be described later.

Also, one or plurality of buffer member holes 232 may be defined in the first moving mass 23, and the buffer member holes 232 will be described below in detail with reference to the accompanying drawings. The buffer member holes 232 may also be defined in the second moving mass 24.

Figure 10:
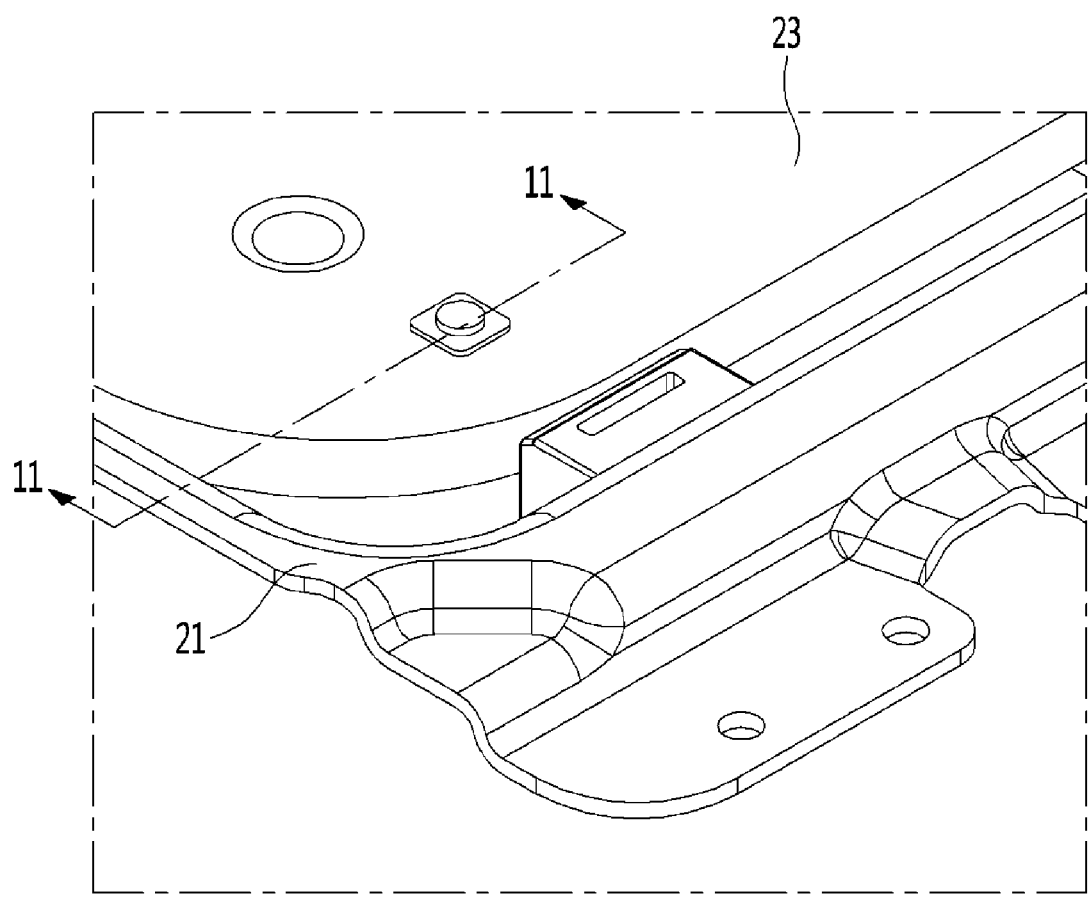
FIG. 10 is a view illustrating a buffer structure for vertical oscillation of the first moving mass according to an embodiment.
Figure 11:
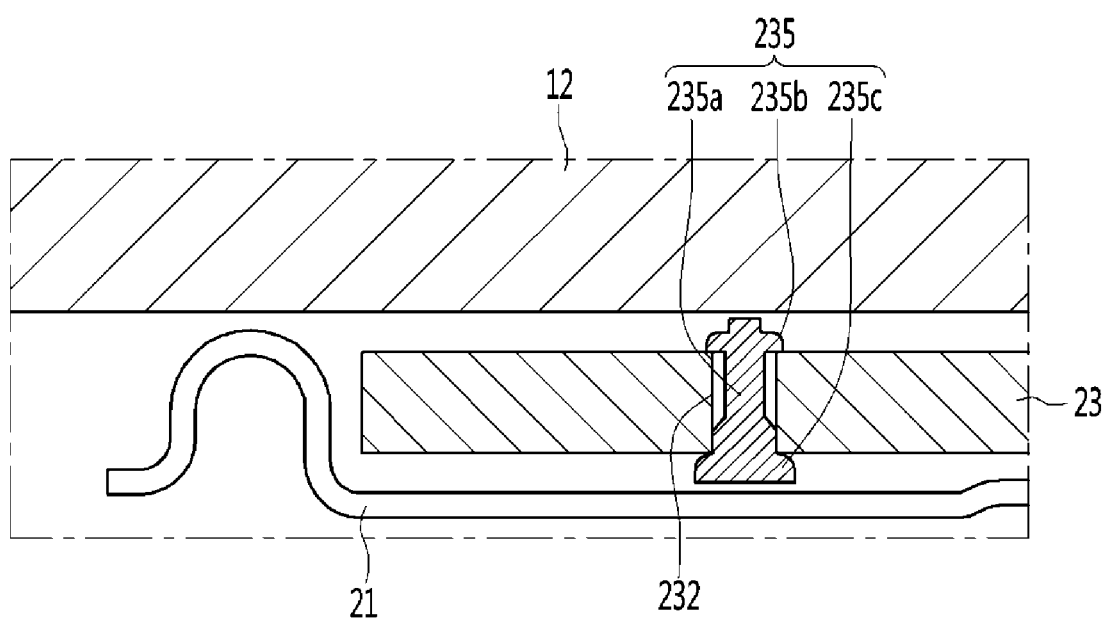
FIG. 11 is a longitudinal cross-sectional view taken along line 11-11 of FIG. 10.

FIG. 10 is a view illustrating a buffer structure for the vertical oscillation of the first moving mass according to an embodiment, and FIG. 11 is a longitudinal cross-sectional view taken along line 11-11 of FIG. 10. Referring to FIGS. 10 and 11, the buffer member hole 232 may be defined in the first moving mass 23, and a buffer pin 235 may be inserted into the buffer member hole 232.

In detail, the buffer pin 235 may include a pin body 235a having an outer diameter corresponding to a diameter of the buffer member hole 232, an upper buffer part 235b provided on an upper end of the pin body 235a, and a lower buffer part 235c provided on a lower end of the pin body 235a. In more detail, at least the upper buffer part 235b and the lower buffer part 235c of the buffer pin 235 may be made of the same material as the buffer pad 234. Also, the lower buffer part 235c may have an outer diameter greater than that of the pin body 235a, and an upper end of the upper buffer part 235b may be spaced apart from a bottom surface of the top plate 12 and higher than the top surface of the first moving mass 23.

Also, in a state in which the buffer pin 235 is coupled to the first moving mass 23, the lower buffer part 235c may be spaced apart from the top surface of the support plate 21. Here, the upper buffer part 235b may be provided as a separate part having an outer diameter greater than a diameter of the buffer member hole 232 and coupled to the upper end of the pin body 235a. Here, the lower buffer part 235c may be integrated with the pin body 235a to form a single body. Alternatively, the upper buffer part 235b and the pin body 235a may be provided in one body, and the lower buffer part 235b may be provided as a separate member and coupled to a lower end of the pin body 235a.

As described above, when the buffer pin 235 is inserted into the buffer member hole 232, the upper and lower ends of the buffer member 235 may not come into contact with the top plate 12 and the support plate 21 when the vertical oscillation does not act on the first moving mass. That is, when the vertical oscillation acts on only the first moving mass 23, the upper and lower ends of the buffer pin 235 may intermittently come into contact with the top plate 12 and the support plate 21. It is noted that the structure of the buffer pin 235 may be equally applied to the second moving mass 24.

Figure 12:
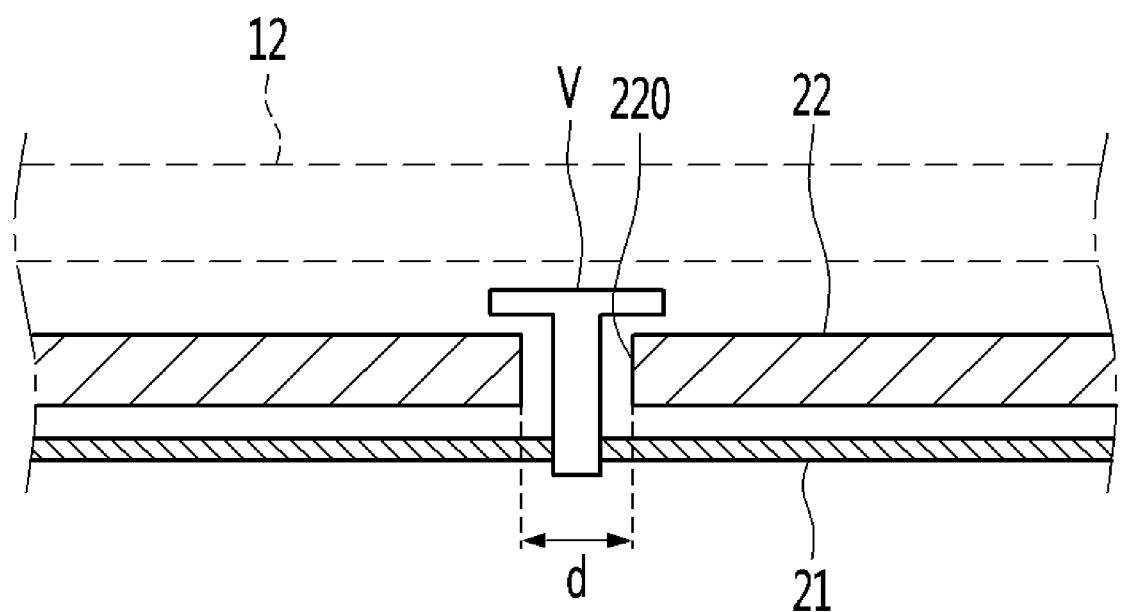
FIG. 12 is a cross-sectional view of a separation prevention structure for preventing the moving mass from being separated from the support plate while the laundry treating apparatus is carried.

FIG. 12 is a cross-sectional view of a separation prevention structure for preventing the moving mass from being separated from the support plate while the laundry treating apparatus is carried. The separation prevention structure may be equally applied to the second moving mass as well as the first moving mass.

Referring to FIG. 12, at least one through-hole 220 having a long-hole shape having the same shape as the guide hole (see reference numeral 233 of FIG. 8) may be defined in the moving mass 22. That is, the through-hole 220 may have a long side and a short side, which respectively have the same length as the long side and the short side of the guide hole 233. In detail, the long side of the guide hole 233 may have a length d equal to that of the long side of the through-hole 220.

Also, a coupling member V such as a bolt may pass through the through-hole 220. Also, the coupling member V may pass through the through-hole 220 from the top surface of the moving mass 22 and then inserted to be fixed to the support plate 21. Also, a main body of the coupling member V accommodated into the through-hole 220 may have the same diameter as a guide boss (that will be described later) of the support 28 fitted into the guide hole 233. Also, a head of the coupling member V may have an outer diameter greater than a length of the short side of at least the through-hole 220 to prevent the moving mass 21 from being separated from the coupling member V during the oscillation.

According to the above-described structure, while the laundry treating apparatus 10 on which the dynamic absorber 20 is mounted is carried, even though the laundry treating apparatus 10 is turned upside down or sideways, the moving mass 22 may not be separated from the support plate 21. Also, since the long side of the through-hole 220 has the same length as the long side of the guide hole 233, the moving mass 22 does not act as an obstacle while being shaken in the lateral direction to absorb the oscillation of the cabinet 11. That is, the coupling member V does not collide with the moving mass 22. This is done because the moving mass 22 is limited in maximum oscillation displacement in the horizontal direction by the elastic damper 25, and the long side of the through-hole 220 has the length d greater than the maximum oscillation displacement of the moving mass 22.

Figure 13:
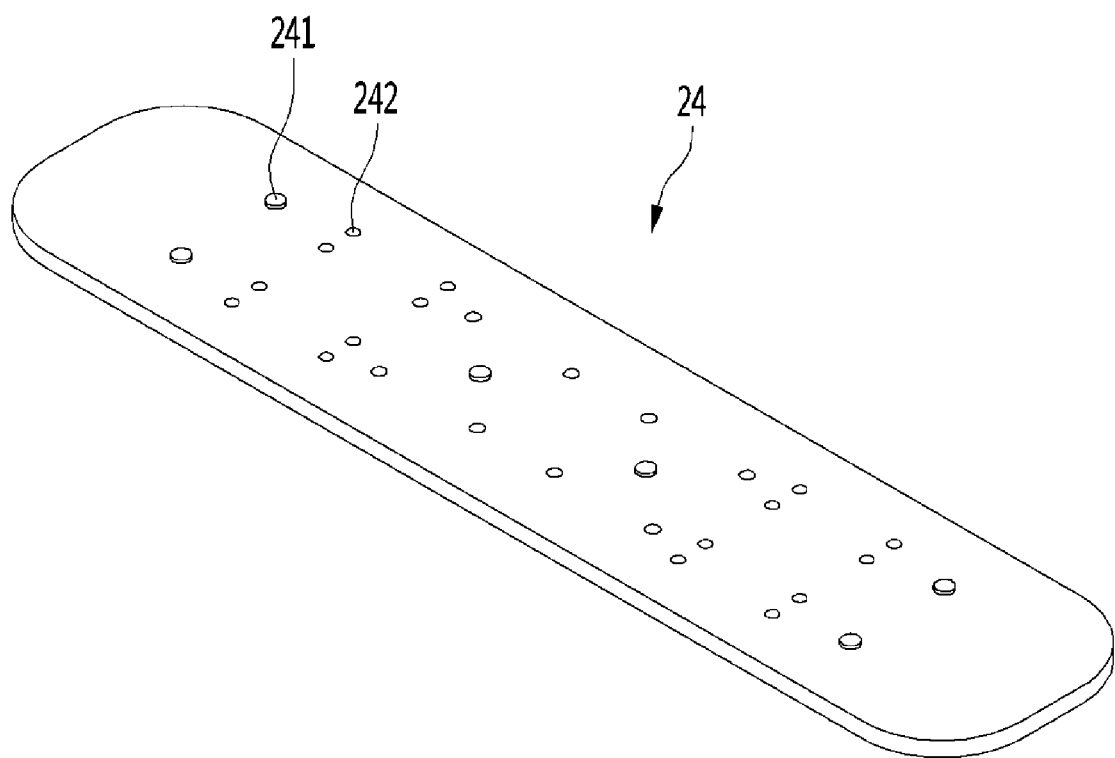
FIG. 13 is a perspective view of a second moving mass according to an embodiment.

FIG. 13 is a perspective view of the second moving mass according to an embodiment. Referring to FIG. 13, the second moving mass 24 according to an embodiment is provided for mainly absorbing the transient oscillation acting on the cabinet 11. In detail, the second moving mass 24 has a mess less than that of the first moving mass 24 and is operated at a rotational speed less than that (rpm) (or the rotation frequency) of the drum in which the first moving mass 23 is operated.

Also, like the first moving mass 23, the second moving mass 24 may have rounded corners each of which has a rectangular shape and be provided as a single mass made of a metal material or have a structure in which a plurality of thin metal plates are laminated. Also, when the moving mass 24 is manufactured by laminating a plurality of thin metal plates, the plurality of thin metal plates may be coupled to each other by the rivet part 241 to form a single body. When a plurality of sliders 29 may be mounted on the bottom surface of the second moving mass 24, and a plurality of slider coupling holes 242 may be defined in portions on which the sliders 29 are mounted.

Figure 14:
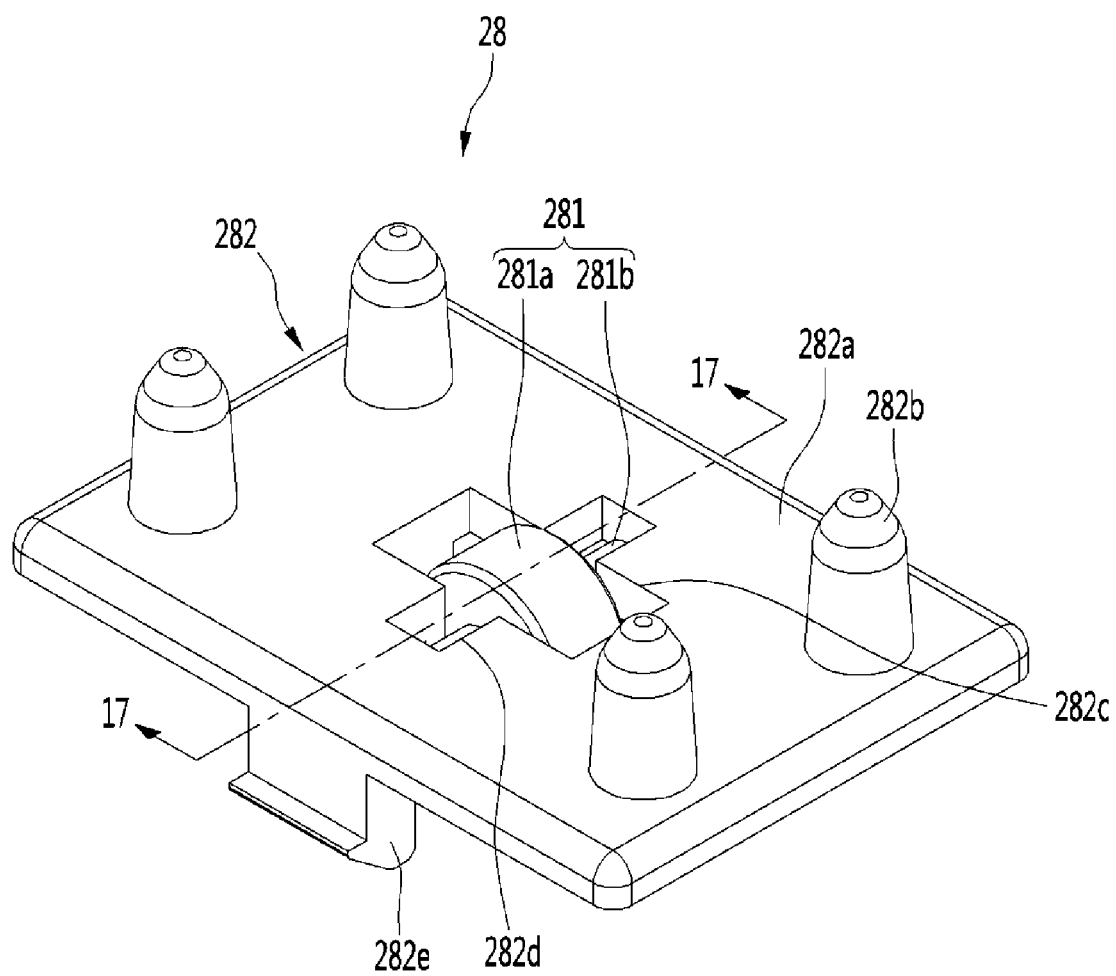
FIG. 14 is a top perspective view of a support according to an embodiment.
Figure 15:
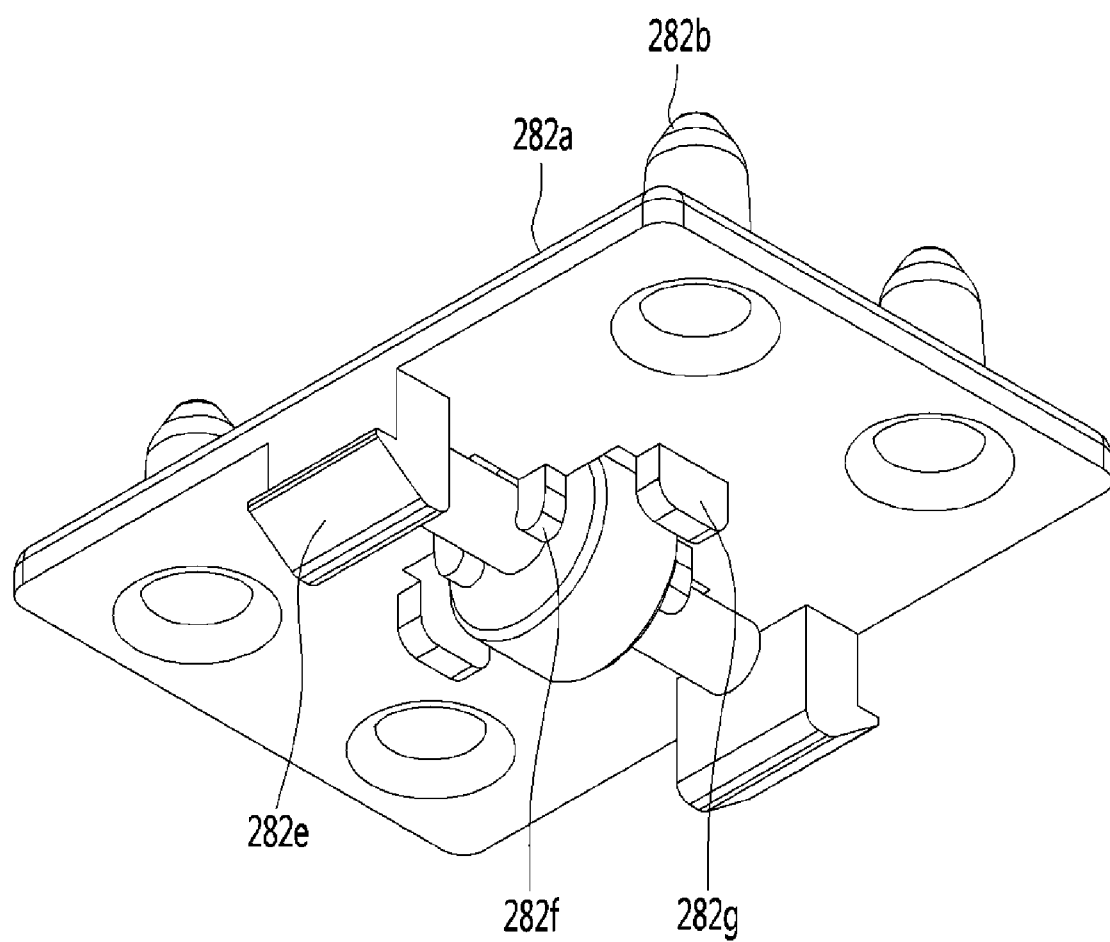
FIG. 15 is a bottom perspective view of the support.
Figure 16:
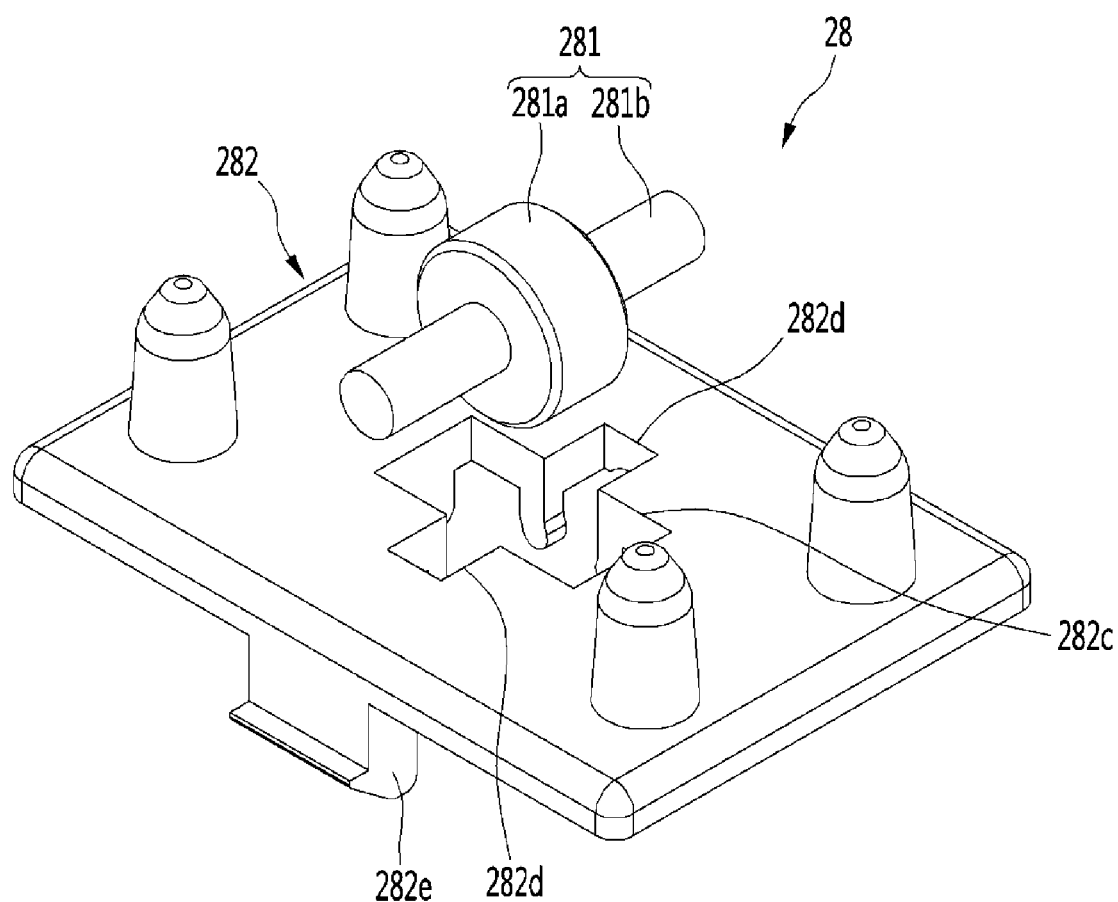
FIG. 16 is an exploded perspective view of the support.
Figure 17:
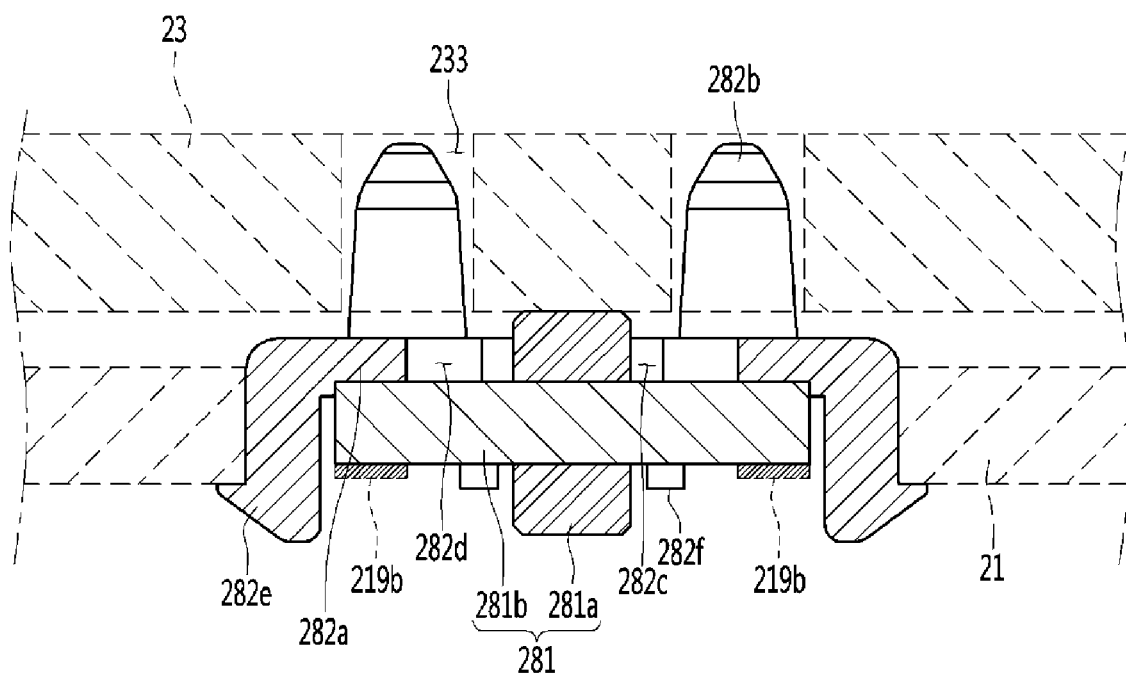
FIG. 17 is a longitudinal cross-sectional view taken along line 17-17 of FIG. 14.

FIG. 14 is a top perspective view of the support according to an embodiment, FIG. 15 is a bottom perspective view of the support, FIG. 16 is an exploded perspective view of the support, and FIG. 17 is a longitudinal cross-sectional view taken along line 17-17 of FIG. 14. Referring to FIGS. 14 to 17, the support 28 according to an embodiment is provided on the bottom surface of the moving mass for absorbing the continuous oscillation.

In detail, the support 28 is provided on the bottom surface of the first moving mass 23 to minimize an occurrence of frictional force when the first moving mass 23 oscillates in the lateral direction, thereby maximizing the absorption of the continuous oscillation at the high-speed rotation. In addition, the support 28 may prevent the first moving mass 23 from drooping by a self-load thereof and allow the first moving mass 23 to oscillate in the horizontal direction as far as possible.

The support 28 may include a roller support part 282 fixed to the support mounting part 219 of the support plate 21 and a guide roller 281 rotatably seated on the roller support part 282. The guide roller 281 includes a roller 281a and a roller shaft 281b passing through a center of the roller 281a. The roller 281a comes into line contact with the bottom surface of the moving mass 23 to rotate together with the first moving mass 23. Although the guide roller 281 is provided to minimize the frictional force generated between the first moving mass 23 and the support 2, it is noted that a ball bearing that comes into point contact with the first moving mass 23 may be applied.

Also, the roller support part 282 may include a seating plate 282a seated on the top surface of the support plate 21, at least a pair of coupling hooks 282e respectively extending downward from front and rear ends of the seating plate 282a, an accommodation hole defined in a center of the seating plate 282a, and a plurality of guide bosses 282b protruding by a predetermined length from a top surface of the seating plate 282a. In detail, the coupling hooks 282e are provided to respectively extend from front and rear ends of the seating plate 282a, but are not limited thereto. For example, a plurality of coupling hooks may be provided on each of the front and rear ends.

Also, two guide bosses 282b are provided to respectively protrude from left and right edges of the seating plate 282a, but are not limited thereto. For example, one guide boss 282b may be provided to protrude from each of the left and right edges. Also, the guide boss 282b is inserted into the guide hole 233 of the first moving mass 23. Thus, the number of guide holes 233 corresponding to the number of guide bosses 282b may be provided. Also, when the first moving mass 23 oscillates in the lateral direction, the guide boss 282b may relatively move in the lateral direction within the guide hole 233. The guide boss 282b may have a diameter corresponding to the length of the short side of the guide hole 233.

Also, the accommodation hole may include a roller shaft accommodation hole 282d extending from the center of the seating plate 282a in the front and rear direction to accommodate the roller shaft 281b and a roller accommodation hole 282c extending from the center of the seating plate 282a in the lateral direction to accommodate the roller 281a.

Also, as illustrated in FIG. 15, a shaft support rib 282f may protrude from each of left and right edges of a bottom surface of the roller shaft accommodation hole 282d. In detail, the pair of shaft support ribs 282f extending from points facing each other may be provided on front and rear end points of the roller accommodation hole 282c to support portions of the front roller shaft 281b and the rear roller shaft 281b with respect to the roller 281a, respectively. As illustrated in FIG. 17, the roller shaft 281b is supported by the shaft support ribs 282f and also supported by the roller shaft support part 219b provided to be rounded in an arc shape on the support plate 21.

Also, a shake prevention rib 282g extends from each of bottom surfaces of left and right ends of the roller accommodation hole 282c. The pair of shake prevention ribs 282g may be hooked on the left and right ends of the roller hole 219a defined in the support plate 21 to prevent the seating plate 282a from being shaken in the lateral direction. If the shake prevention ribs 282g are not provided, fastening force of the pair of coupling hooks 282e should be considerably large. However, since the shake prevention ribs 282g are provided, it is sufficient that the pair of coupling hooks 282e is hooked on the support plate 21. Also, the phenomenon in which the seating plate 282a is shaken in the lateral direction is prevented by the shake prevention ribs 282g.

Figure 18:
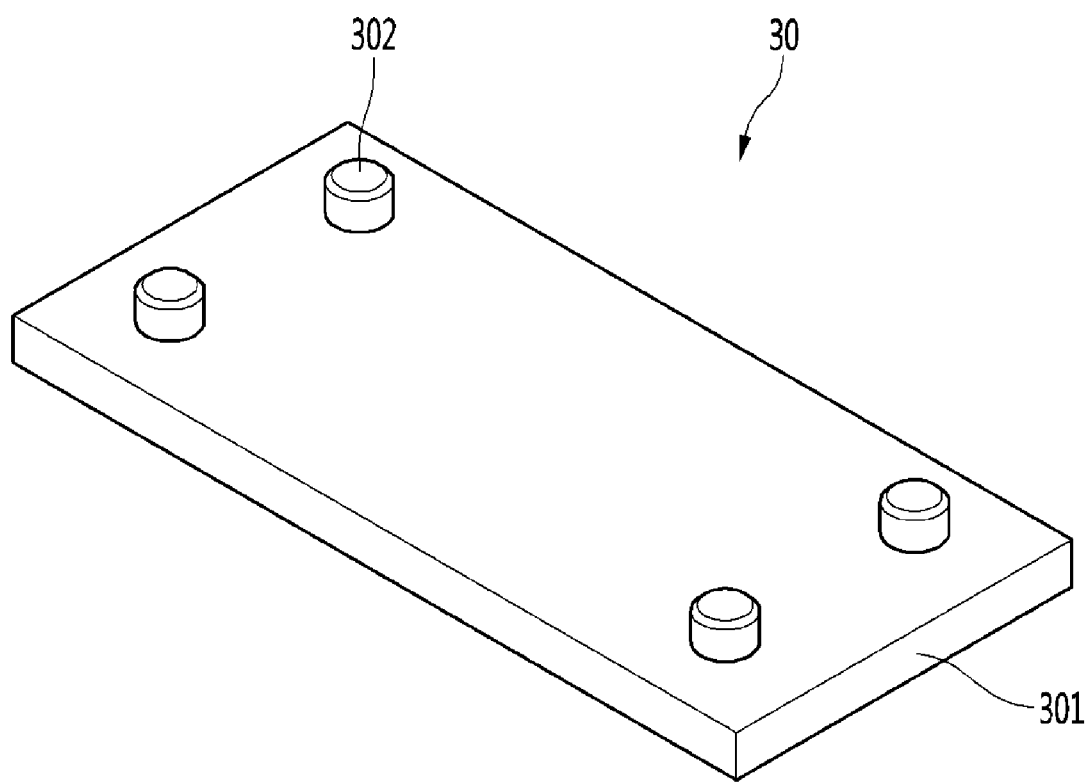
FIG. 18 is a top perspective view of an upper slider constituting a slider according to an embodiment.
Figure 19:
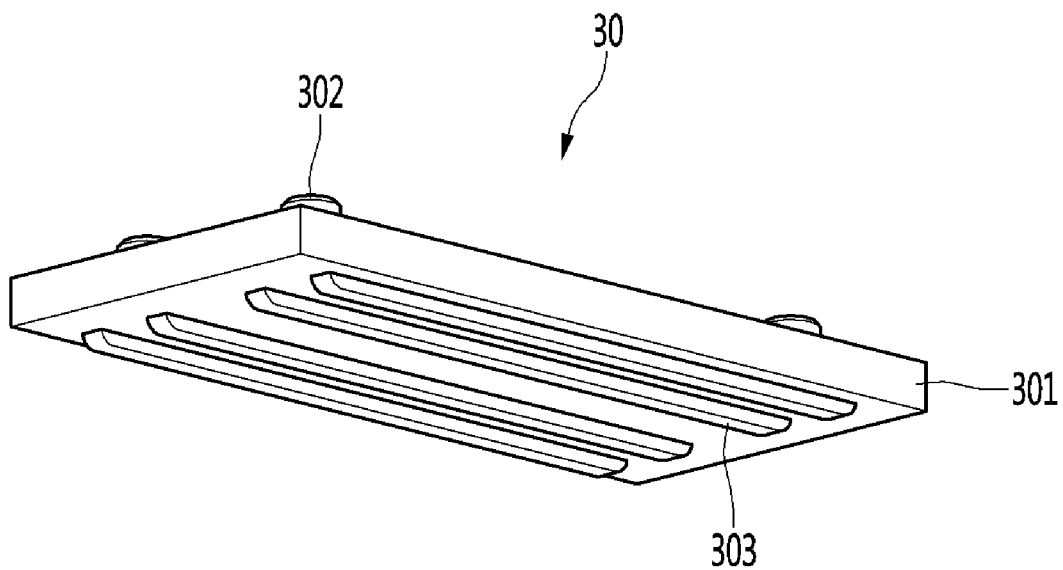
FIG. 19 is a bottom perspective of the upper slider.
Figure 20:
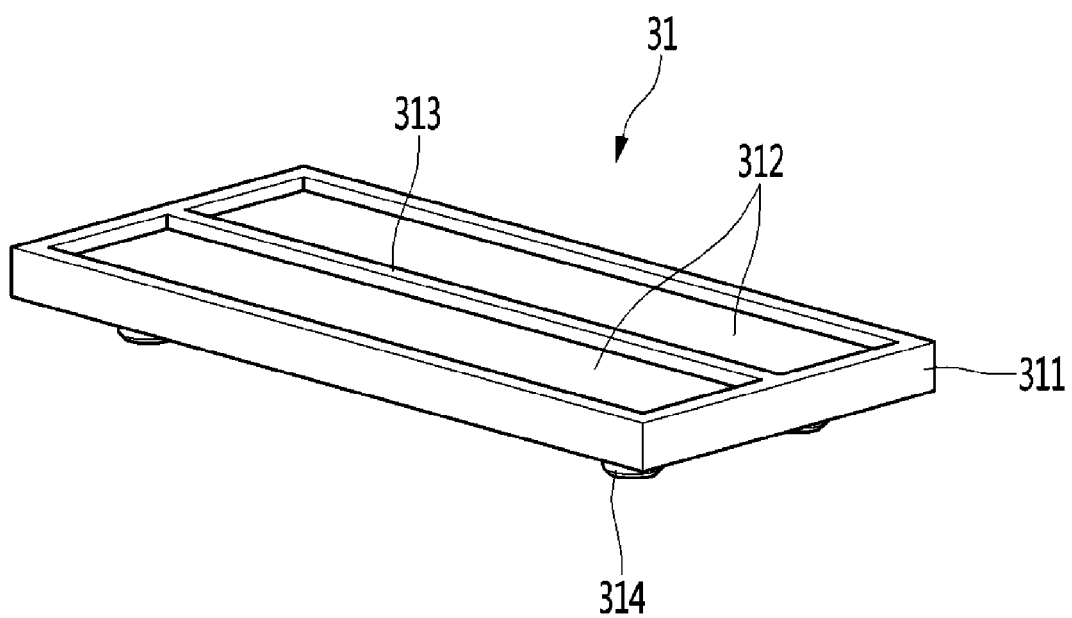
FIG. 20 is a top perspective view of a lower slider constituting the slider.
Figure 21:
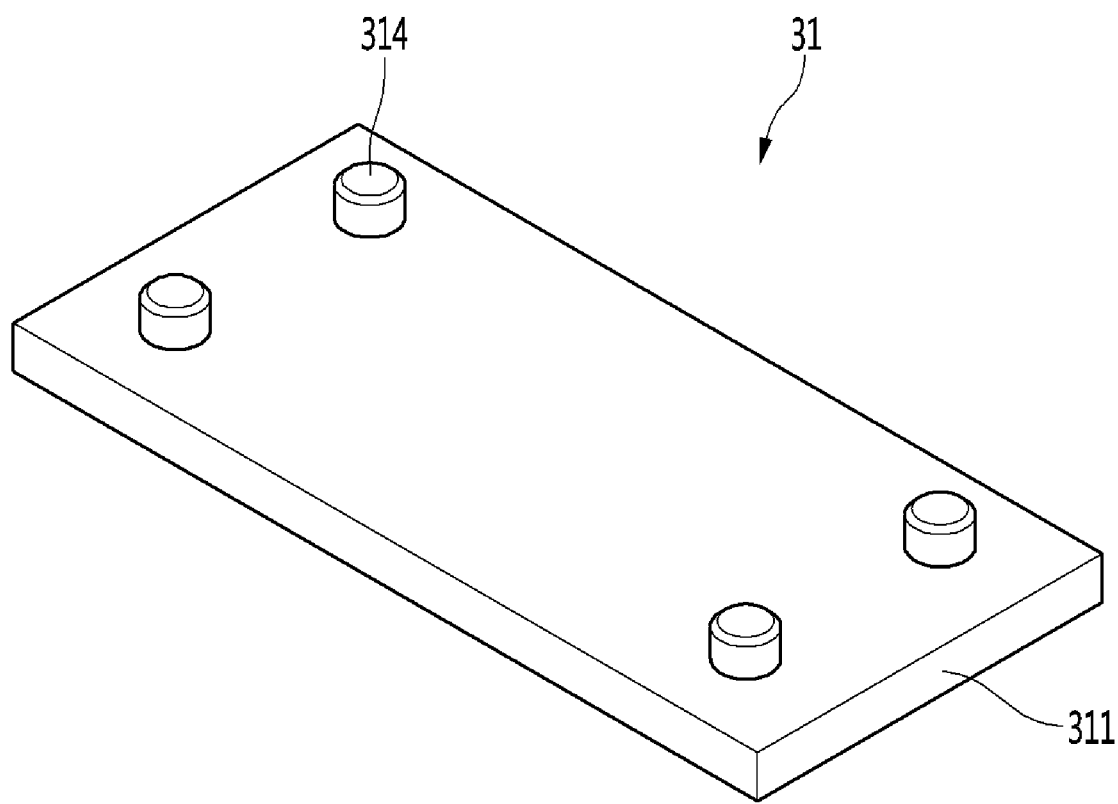
FIG. 21 is a bottom perspective view of the lower slider.
Figure 22:
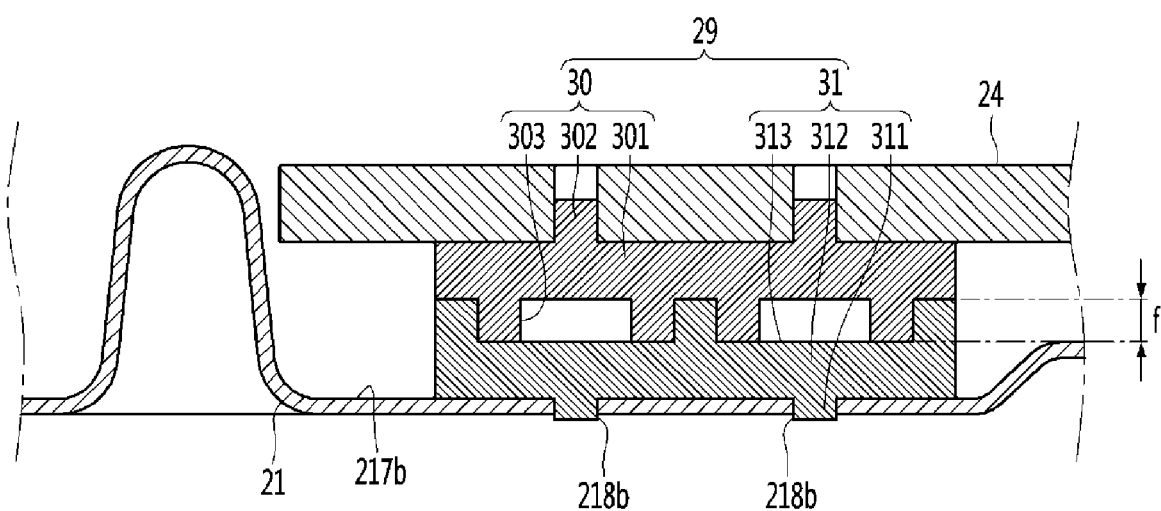
FIG. 22 is a longitudinal cross-sectional view taken along line 22-22 of FIG. 3.

FIG. 18 is a top perspective view of an upper slider constituting a slider according to an embodiment, FIG. 19 is a bottom perspective of the upper slider, FIG. 20 is a top perspective view of a lower slider constituting the slider, FIG. 21 is a bottom perspective view of the lower slider, and FIG. 22 is a longitudinal cross-sectional view taken along line 22-22 of FIG. 3. Referring to FIGS. 18 to 22, the slider 29 according to an embodiment is mounted on the bottom surface of the moving mass for absorbing the transient oscillation. Thus, the slider 29 may be provided on the bottom surface of the second moving mass 24. In detail, the slider 29 has a structure in which an upper slider 30 and a lower slider 31 are coupled to each other. The upper slider 30 and the lower slider 31 slidably move with respect to each other with predetermined frictional attenuation.

The second moving mass 24 absorbs the transient oscillation generated at the resonant point of the drum by the magnitude of the frictional attenuation of the slider 29. Also, the transient oscillation absorption region (or oscillation absorption width) is determined by the magnitude of the frictional attenuation and the mass of the second moving mass 24. In detail, the upper slider 30 may include an upper slider body 301 having an approximately rectangular shape, a plurality of coupling protrusions 302 protruding from four corners of a top surface of the upper slider body 301, and a plurality of slider rails 303 protruding from a bottom surface of the upper slider body 301 and extending in a longitudinal direction of the upper slider body 301.

In detail, the plurality of coupling protrusions 302 may be inserted into the plurality of slider coupling holes 242 defined in the second moving mass 24. The number of the slider coupling holes 242 corresponding to the number of coupling protrusions 302 may be defined in the second moving mass 24. Also, the plurality of slider coupling holes 242 corresponding to the number and position of the coupling protrusions 302 may form one slider coupling hole group. Also, a plurality of slider coupling hole groups may be defined in the second moving mass 24 so that the upper slider 30 is coupled to the bottom surface of the second moving mass 24 at various positions.

The coupling protrusions may protrude from the four corners of the top surface of the upper slider body 301, but are not limited thereto. For another example, one coupling protrusion may protrude from a center of one edge of the top surface of the upper slider body 301, and also, the coupling protrusion may protrude from each of two corners of the facing edge in a three point supporting manner. For further another example, at least two coupling protrusions may be arranged in a row in a width direction or a longitudinal direction at the center of the top surface of the upper slider body 301.

Also, a pair of two slider rails 303 may be inserted into rail accommodation grooves 312 (that will be described later) defined in the lower slider 31. When the slider rails 303 are accommodated into the rail accommodation grooves 312, the second moving mass 24 may be shaken in the horizontal direction in a phase opposite to that of the excitation force generated by the rotational force of the drum on the support plate 21. Also, when the slider rails 303 are accommodated into the rail accommodation grooves 312, the second moving mass 24 may be prevented from being shaken in the front and rear direction of the cabinet 11.

Although the two slider rails 303 are accommodated into the rail accommodation grooves 312, an embodiment of the present disclosure is not limited thereto. For example, it is noted that at least three slider rails 303 may be accommodated into the rail accommodation grooves 312.

Also, the lower slider 31 may have a rectangular shape with the same size as the upper slider 30. In detail, the lower slider 31 may include a lower slider body 311 having the same shape as the upper slider body 301, a rail accommodation groove 312 extending in the longitudinal direction of the lower slider body 311 on the top surface of the lower slider body 311, and a plurality of coupling protrusions 314 protruding from a bottom surface of the lower slider body 311.

Here, a protruding length of each of the slider rails 303 of the upper slider 30 may be equal to or slightly greater than a recessed depth f of each of the rail accommodation grooves 312. Also, the recessed depth f of the rail accommodation groove 312 may be greater than a distance between the top surface of the second moving mass 24 and the bottom surface of the top plate 12. In this case, while the laundry treating apparatus 10 is carried, even though the laundry treating apparatus 10 is turned upside down or tilted, the slider rail 303 may be prevented from being separated from the rail accommodation groove 312.

In more detail, the plurality of coupling protrudes 314 may have the same shape and number as the plurality of coupling protrusions 314 provided on the upper slider 30 on the same formation position. Thus, duplicated description of the plurality of coupling protrusions 314 provided on the lower slider 31 will be omitted. Of course, the plurality of slider coupling holes 218b into which the plurality of coupling protrusions 314 are inserted may be defined in the support plate 21, particularly, the second forming part 217b of the support plate 21. Also, the plurality of slider coupling holes 218b may be defined in a plurality of positions constituting groups having numbers corresponding to the number of lower sliders 31.

Also, the plurality of rail accommodation grooves 312 may be arranged in parallel to each other with a width less than that of the slider body 311. That is, the rail accommodation groove 312 may be partitioned into the plurality of rail accommodation grooves by the partition wall 313. In this embodiment, although the two rail accommodation grooves 312 are arranged in parallel to each other in the width direction of the slider body 311, an embodiment of the present disclosure is not limited thereto. For example, at least three rail accommodation grooves may be arranged in parallel to each other. Of course, a single rail accommodation groove 312 may be defined without providing the partition wall 313.

Also, two or more slider rails 303 may be accommodated in each of the rail accommodation grooves 312, and at least two slider rails 303 may come into contact with front and rare edges of the rail accommodation groove 312. That is, the frontmost rail of the at least two slider rails 303 accommodated into the rail accommodation groove 312 may come into contact with the front edge of the rail accommodation groove 312, and the rear rail may come into contact with the rear edge of the rail accommodation groove 312. For example, when three slider rails are provided, two slider rails may come into contact with front and rear surfaces of the rail accommodation groove 312, the rest may be provided at a center of the rail accommodation groove 312.

As described above, since the front and rear surfaces and the bottom surface of the at least two slider rails 303 come into contact with the front and rear surfaces and the bottom surface of the rail accommodation groove 312, when the second moving mass 24 moves in the lateral direction (the longitudinal direction of the slider), the attenuation due to the frictional force may act to absorb the transient oscillation.

The frictional force generated in the slider 29 acts as attenuation of the second moving mass 24. Also, the attenuation of the second moving mass 24 may act as a variable for determining the oscillation displacement of the transient oscillation. Also, a frictional coefficient of the frictional force determines the magnitude of the attenuation. The more the attenuation (or an attenuation value) increases, the more the transient oscillation absorption capacity of the dynamic absorber 20 is improved.

Of course, since the elastic damper 23 has the attenuation function for absorbing the transient oscillation as well as the elastic (or rigidity), although it affects the improvement of the transient oscillation, it is significantly smaller than the attenuation due to the friction. Thus, the elastic damper 23 may be damper that mainly affects the continuous oscillation transmitted to the cabinet 11 by the dynamic absorber 20.

In addition, it is possible to obtain an effect of preventing the second moving mass 24 from being shaken in the front and rear direction (the front and rear width direction of the slider) of the laundry treating apparatus 10. Also, the upper slider 30 and the lower slider 31 may be molded by using engineering plastic made of polyoxymethylene (POM). Also, since a noise is generated when the plastic made of the same material moves while coming into contact therewith, a lubricant such as grease may be applied to the rail accommodation groove 312.

The rail accommodation groove 312 has a length greater than that of the slider rail 303 so that the upper slider 30 is reciprocated in the lateral direction on the lower slider 31. This is done because, if the upper slider 30 does not move in the lateral direction on the lower slider 31, the second moving mass 24 does not oscillate in a phase opposite to the oscillation of the cabinet. In detail, a value obtained by subtracting the length of the slider rail 303 from the length of the rail accommodation groove 312 in the lateral direction is equal to or greater than the moving displacement of the second moving mass 24.

Figure 23:
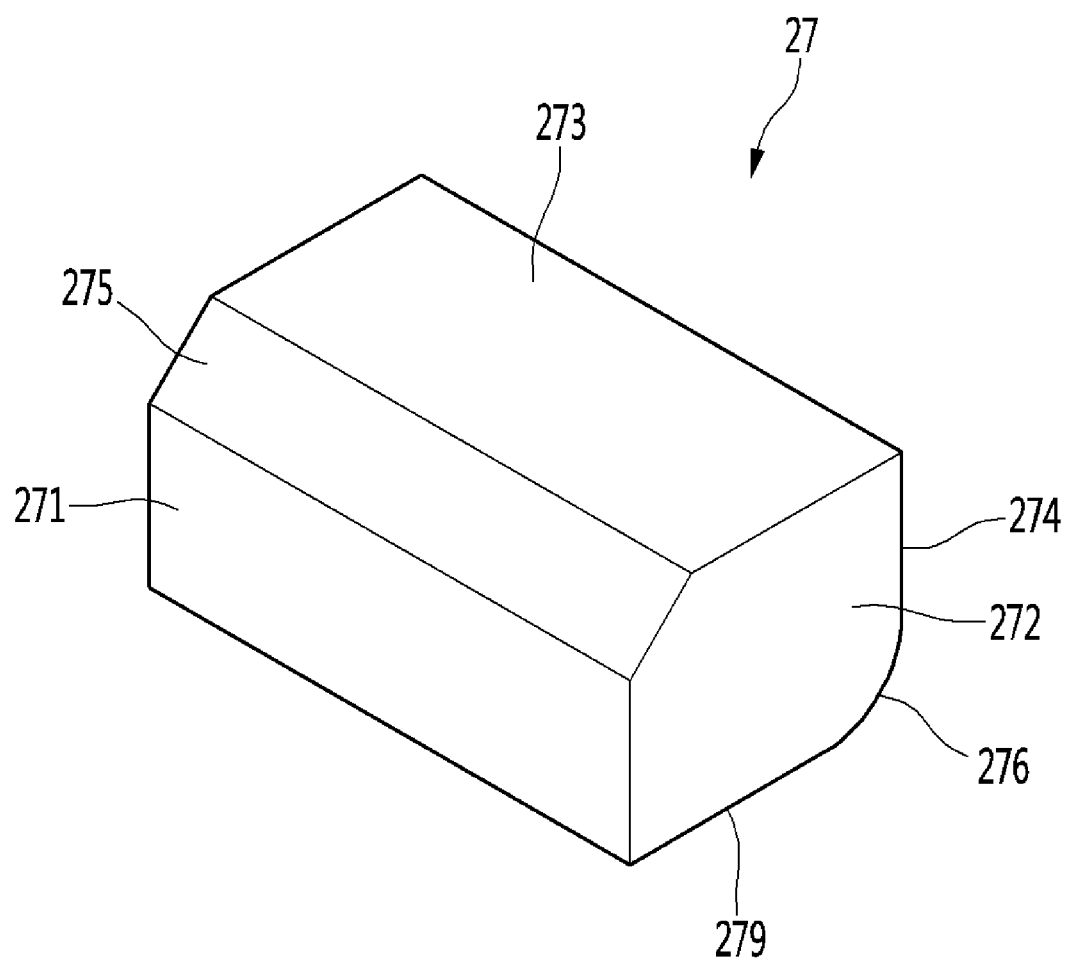
FIG. 23 is a top perspective view of a second elastic damper according to an embodiment.
Figure 24:
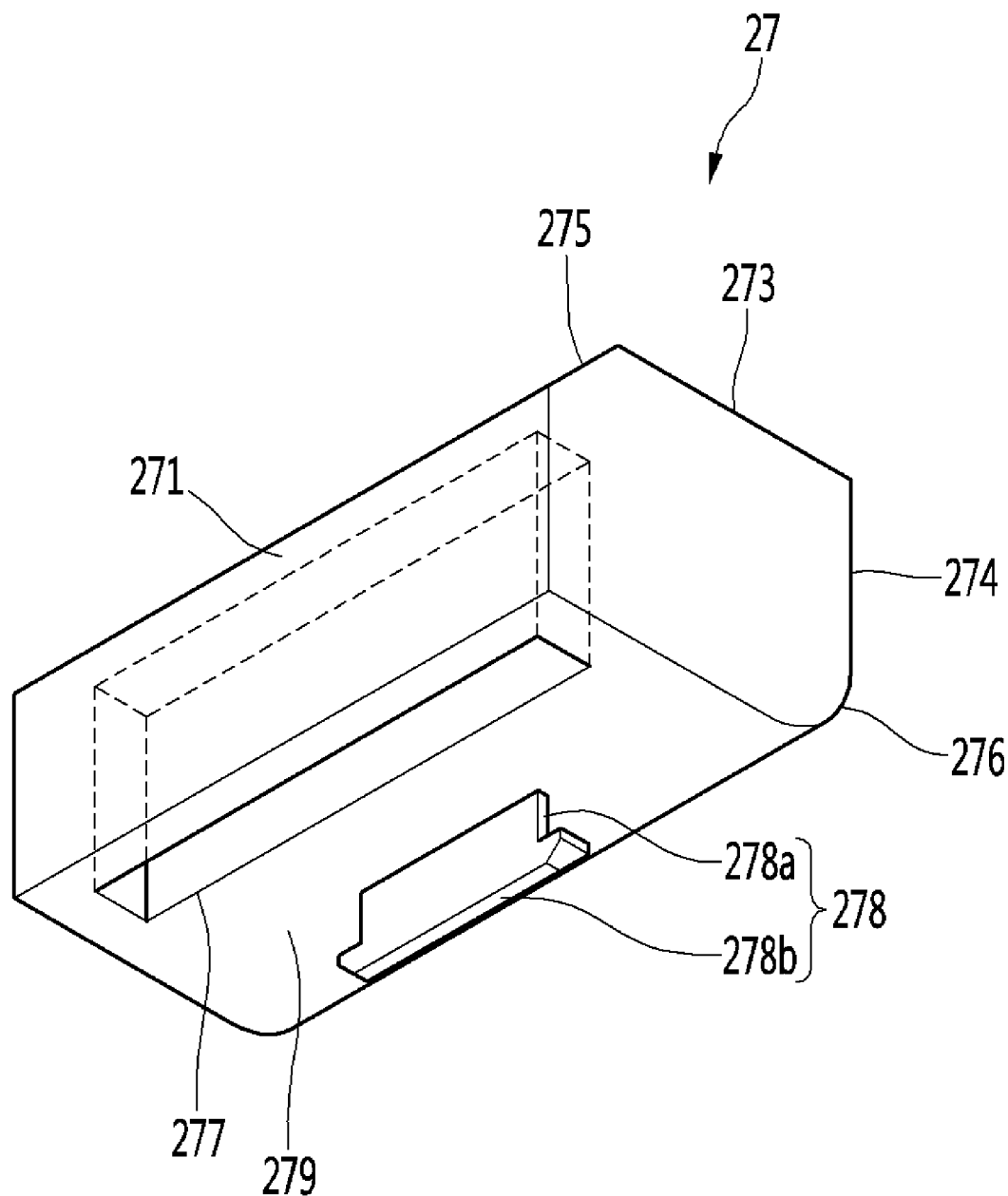
FIG. 24 is a bottom perspective view of the second elastic damper.

FIG. 23 is a top perspective view of a second elastic damper according to an embodiment, and FIG. 24 is a bottom perspective view of the second elastic damper. Referring to FIGS. 23 and 24, the dynamic absorber 20 according to an embodiment includes a second elastic damper 27 mounted on the side surface of the moving mass for absorbing the transient oscillation.

The second elastic damper 27 constituting the dynamic absorber 20 according to an embodiment may be provided on each of left and right edges of the second moving mass 24. In detail, when the second moving mass 24 is shaken in the lateral direction, each of the left and right edges of the second moving mass 24 may collide with the second elastic damper 27. Here, while the second elastic damper 27 is elastically deformed, the second elastic damper 27 absorbs an impact of the second moving mass 24.

Also, although two second elastic dampers 27 are provided on each of the left and right edges of the second moving mass 24, an embodiment of the present disclosure is not limited thereto. For example, at least three second elastic dampers 27 may be provided each of the left and right edges of the second mass 24. For example, the second elastic dampers 27 may be provided on the rear ends, central portions, and front ends of both edges of the second moving mass 24, respectively.

Also, each of the second elastic dampers 27 may have a hexahedral shape having a front surface 271, a rear surface 274, side surfaces 272, a top surface 273, and a bottom surface 279. Also, an inclined portion 275 may be provided at a corner at which the front surface 271 and the top surface 273 meet each other, or the corner may be rounded.

Also, a rounded portion 276 or an inclined portion may also be provided at a corner at which the bottom surface 279 and the rear surface 274 meet each other. Since the inclined portion 275 is provided, when the horizontal force of the second moving mass 24 is applied to the front surface 271, the second elastic damper 27 may be deformed in shape to protrude and thereby to be prevented from interfering with the top plate 12.

Also, since the rounded portion 276 is provided, when the horizontal force of the second moving mass 24 is applied to the front surface 271, a corner of the rear surface of the second elastic damper 27 may protrude to be prevented from interfering with a corner of the side edge of the moving mass seating part 241. Also, the second elastic damper 27 may further include an elastic groove 277 recessed upward from the bottom surface 279 and a coupling arm 278 protruding from the bottom surface 279 and fitted into the coupling slit 216.

In detail, when the second moving mass 24 presses the bottom surface of the second elastic damper 27 while being shaken in the horizontal direction, the elastic groove 277 may be provided to allow the second elastic damper 27 to be easily deformed to wall absorb the impact. The elastic groove 277 may be defined as an impact absorption groove. Here, the elastic groove 277 may be recessed with a predetermined width in left/right and front/rear direction and a predetermined depth upward.

The elastic groove 277 may be defined in a position closer to the front surface 271 than the rear surface 274 to facilitate the impact absorption of the second moving mass 24. Also, the elastic groove 277 may have a structure in which the elastic groove 277 is opened in the top surface of the second elastic damper 27 and recessed downward in addition to a structure in which the elastic groove 277 is opened in the second elastic damper 27 and recessed upward. For example, the elastic groove 277 may be opened in the inclined portion 275 and recessed by a predetermined depth downward.

Also, the coupling arm 278 may include an extension end 278a extending by a predetermined length from the bottom surface 279 and a hook protrusion 278b extending from a side edge of an end of the extension end 278a. That is, the coupling arm 278 may have a longitudinal cross-section with an inverted T shape, but is not limited thereto. When the coupling arm 278 has the longitudinal cross-section with the inverted T shape, since the coupling slit 216 may have a T or I shape, the coupling arm 278 may be more easily inserted.

In detail, to couple the coupling arm 278 to the coupling slit 216, the second elastic damper 27 is inclined tilted to allow an end of the hook protrusion 278b to be provided on the short side of the coupling slit 216. Here, the extension end 278a is provided on the long side of the coupling slit 216. In this state, the second elastic damper 27 moves along the long side of the coupling slit 216 so that the second elastic damper 27 becomes a horizontal state while the hook protrusion 278b is pushed to be inserted into the short side of the coupling slit 216. Also, when the second elastic damper 27 completely becomes the horizontal state, the second elastic damper 27 may be completely inserted into the coupling slit 216.

Also, to prevent the second elastic damper 27 from being shaken in the vertical direction in the state of being coupled to the support plate 21, the extension end 278a may have a length corresponding to a thickness of the support plate 21. That is, a distance between the bottom surface 279 and the upper end of the hook protrusion 278b may be equal to the thickness of the support plate 21. Also, the coupling arm 278 may be provided at a position closer to the rear surface 274 than the front surface 271 of the second elastic damper 27, but is not limited thereto.

Figure 25:
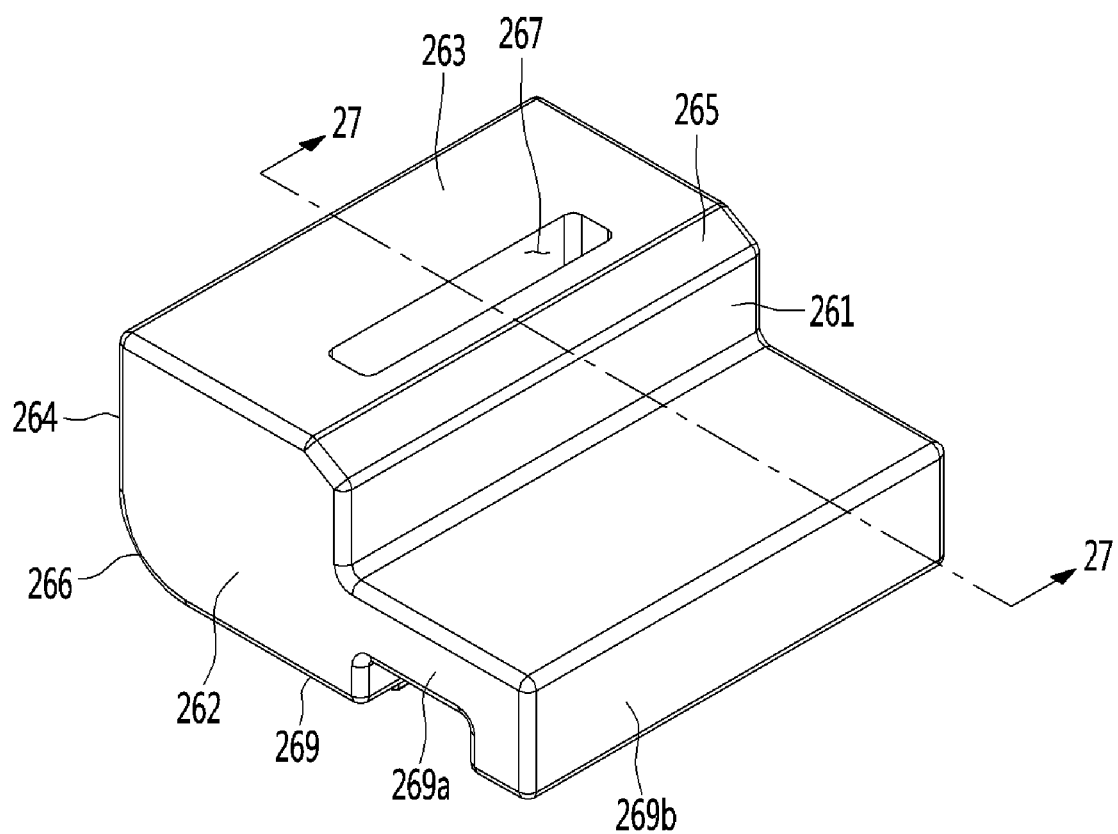
FIG. 25 is a top perspective view of a first elastic damper according to an embodiment.
Figure 26:
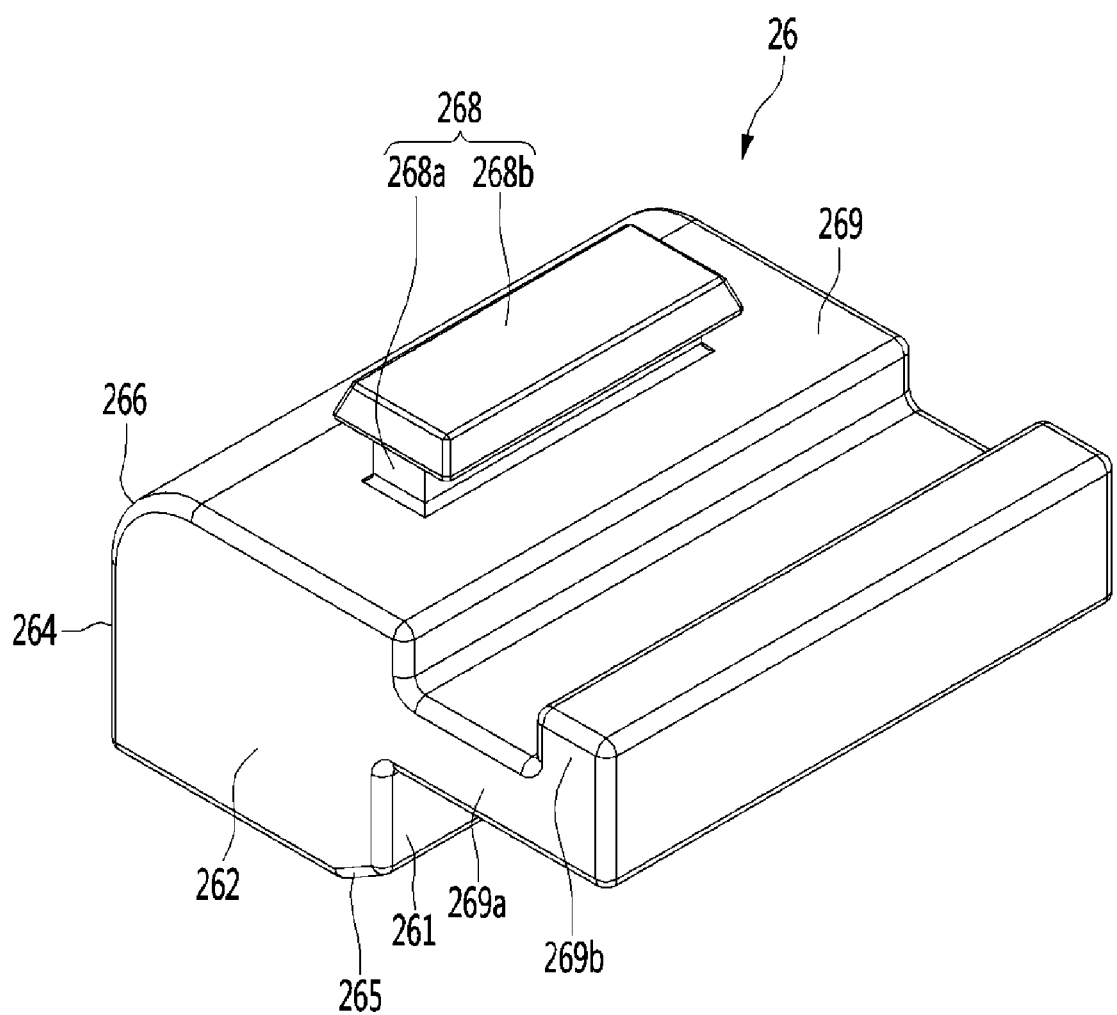
FIG. 26 is a bottom perspective view of the first elastic damper.
Figure 27:
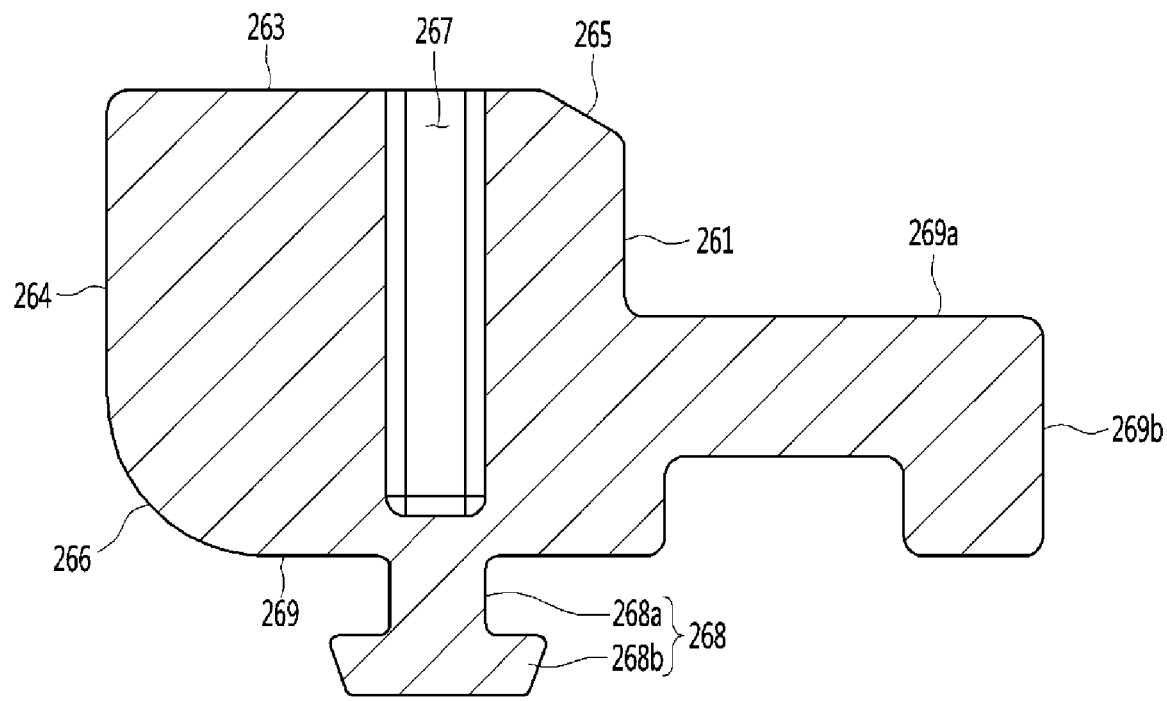
FIG. 27 is a longitudinal cross-sectional view taken along line 27-27 of FIG. 25.

FIG. 25 is a top perspective view of the first elastic damper according to an embodiment, FIG. 26 is a bottom perspective view of the first elastic damper, and FIG. 27 is a longitudinal cross-sectional view taken along line 27-27 of FIG. 25. Referring to FIGS. 25 to 27, the first elastic damper 26 according to an embodiment may be mounted on the side surface of the moving mass for absorbing the continuous oscillation. In detail, the first elastic damper 26 may include a side support part having the same as the second elastic damper and a bottom support part horizontally extending from the side support part.

Also, although two first elastic dampers 26 are provided on each of the left and right edges of the first mass 23, an embodiment of the present disclosure is not limited thereto. For example, at least three first elastic dampers 26 may be provided each of the left and right edges of the first mass 23. For example, the first elastic dampers 26 may be provided on the rear ends, central portions, and front ends of both edges of the first moving mass 23, respectively.

Also, the side support part of the first elastic damper 26 may have the same shape as the second elastic damper 27. That is, the side support part of the first elastic dampers 26 may have a hexahedral shape having a front surface 261, a rear surface 264, side surfaces 262, a top surface 263, and a bottom surface 269. Also, an inclined portion 265 may be provided at a corner at which the front surface 261 and the top surface 263 meet each other, or the corner may be rounded.

Also, the first elastic damper 26 may further include an elastic groove 266 and a coupling arm 268. In detail, the elastic groove 266 may be recessed by a predetermined depth downward from the top surface 263 or recessed by a predetermined depth upward from the bottom surface 269.

Also, the coupling arm 268 may include an extension end 268a and a hook protrusion 268b. A method for inserting the coupling arm 268 into the coupling slit 216 may be equal to that for inserting the coupling arm 278 into the coupling slit 216. The bottom support part may be a portion for supporting an edge of the bottom surface of the first moving mass 23 and include a horizontal part 269a and a vertical part 269b.

In detail, the horizontal part 269a may extend horizontally from the front surface 261, and the vertical part 269b may extend downward from an end of the horizontal part 269a. Also, the horizontal part 269a may be designed to extend horizontally from a position spaced upward from a lower end of the front surface 261 so as to be elastically deformed.

The first moving mass 23 may have a mass that is relatively larger than that of the second moving mass 24 and be operated to rotate at a high speed. That is, the first moving mass 23 oscillate at a high frequency to reduce the continuous oscillation generated when the drum is maintained at the maximum speed. In this case, the first moving mass 23 may oscillate in a vertical direction as well as a horizontal direction. When the first moving mass 23 oscillates in the vertical direction, the left and right ends of the first moving mass 23 may come into contact with the support plate 21 to generate noise. To present this phenomenon from occurring, the bottom support part may support the bottom surfaces of the left and right edges of the first moving mass 23.

Alternatively, when the first moving mass 23 is maintained in the horizontal state by the support 28, the second elastic damper 27 instead of the first elastic damper 26 may be provided on the side surface of the first moving mass 23. Ideally, it is advantageous in terms of lowering the frictional attenuation that the first moving mass 23 does not come into contact with the horizontal part 269a while being shaken in the lateral direction. However, when the first moving mass 23 oscillates in the horizontal state, the first moving mass 23 is maintained in the state of being spaced apart from the horizontal part 269a, and only when the horizontal state of the first moving mass 23 is broken, the first moving mass 23 may come into contact with the horizontal part 269a to achieve both of the two purposes.

Hereinafter, a method for effectively absorbing the transient oscillation and the continuous oscillation generated in the cabinet 11 through the dynamic absorber 20 to improve the oscillation will be described. Equation 1 below is a dimensionless response formula showing the behavior of the dynamic absorber 20 with respect to the oscillation generated when the drum having the eccentric load rotates.

$$Y = \sqrt{\frac{(2\zeta r)^2 + (r^2 - \beta^2)^2}{(2\zeta r)^2(r^2 - 1 + \mu r^2)^2 + [\mu r^2 \beta^2 - (r^2 - 1)(r^2 - \beta^2)]^2}} \quad \text{(Equation 1)}$$

wherein:

$$r = \frac{\omega}{\omega_p}, \quad \mu = \frac{m_a}{m_p}, \quad \beta = \frac{\omega_a}{\omega_p}, \quad \zeta = \frac{c_a}{2m_a\omega_p},$$

and
wherein
Y: Dimensional oscillation displacement (or amplitude) of moving mass
 r: Operating speed ratio (or operating frequency ratio)
 ω: Rotational speed (or rotation frequency) of drum
 ωa: Natural oscillation (or natural frequency) of moving mass
 ωp: Natural oscillation (or natural frequency) of laundry treating apparatus
 β: Oscillation ratio (or frequency ratio)
 μ: Mass ratio
 ma: Mass of moving mass
 mp: Mass of laundry treating apparatus
 ζ: Attenuation ratio
 ca: Attenuation of moving mass A dimensionless response formula of the dynamic absorber is expressed by using a mass ratio, an oscillation ratio, and attenuation ratio as variables. Also, although the mass ratio is strictly defined as the mass ratio of the moving mass 22 to the mass of the laundry treating apparatus 10, it may be regarded as the mass ratio of the dynamic absorber 20 to the mass of the laundry treating apparatus 10. This is done because the mass is regarded as a portion of the mass of the laundry treating apparatus 10 and has little effect on determining the total mass of the laundry treating apparatus 10 because the components of the dynamic absorber 20 except for the moving mass 22 are fixed to the laundry treating apparatus 10. Also, this is done because the upper slider 30 has a mass which is negligible with respect to the mass of the moving mass 22. Thus, it is noted that the mass ratio may be interpreted as the mass ratio of the dynamic absorber 20. Also, it is noted that the oscillation ratio and the attenuation ratio may be defined or interpreted as the oscillation ratio of the dynamic absorber 20 and the attenuation ratio of the dynamic absorber 20, like the mass ratio.

A shape of the response curve shown by the response formula is determined by the mass ratio, the oscillation ratio, the attenuation ratio, and oscillation absorption capacity of the dynamic absorber 20 is determined by these variables. That is, when the rotational speed ratio of the drum increases in a state in which the mass ratio, the oscillation ratio, and the attenuation ratio, which are variables of the response formula, a dimensionless amplitude of the dynamic absorber 20 may be calculated, and thus, the calculated dimensionless value may be regarded as an oscillation displacement of the cabinet 11.

Here, the mass ratio of the dynamic absorber 20 is a design variable for determining an oscillation absorption region for absorbing the transient oscillation, and the oscillation ratio (or the frequency ratio) and the attenuation ratio are variables for determining an oscillation displacement of secondary transient oscillation after the attenuation. In detail, when the moving mass (the second moving mass in this specification) for absorbing the transient oscillation of the dynamic absorber 20 is operated at the resonant point, two transient oscillations, which are significantly less than the oscillation displacement when the transient oscillation occurs, may occur.

Also, a distance between the two secondary transient oscillations is defined as an oscillation absorption region or width, and a size of the oscillation absorption region may vary according to the mass ratio. Also, the oscillation displacements, i.e., peak points of the two secondary transient oscillations may vary by adjusting the oscillation ratio and the attenuation ratio. For reference, the two secondary transient oscillations are displayed as two peak points in which the dimensionless amplitude value increases and then decreases. A distance between the two peak points is interpreted as the oscillation absorption region and varies by adjusting the mass ratio.

The resonant frequency generated in the transient oscillation may vary according to a size, mass, product variation, and eccentricity of the laundry (load) put into the drum in the laundry treating apparatus. In such a situation, to effectively absorb the transient oscillation of the laundry treating apparatus 10 to improve the oscillation, the oscillation absorption region has to be equal to or greater than the resonant frequency region.

Here, the oscillation absorption region of the dynamic absorber 20 may be defined as a width between a rotation frequency at which the second moving mass 24 starts to move in a direction opposite to the excitation force generated when the drum rotates to be accelerated and a rotation frequency at which the oscillation is reduced by the excitation force as the rotational speed of the drum increases to allow the second moving mass 24 to be stopped.

Here, a time point at which the moving mass starts to move may be defined as a time point at which the moving mass oscillates in a phase different from the oscillation phase of the cabinet 11 or the support plate 21. In other words, a time point at which the moving mass is stopped may be defined as a time point at which the moving mass oscillates to move in the same phase as the oscillation phase of the cabinet 11 or the support plate 21.

Also, a factor that determines the size of the transient oscillation absorption region of the dynamic absorber 20 is the mass ratio. That is, the more the mass ratio increases, the more the transient oscillation absorption region is widened, and the more the mass ratio decreases, the more the transient oscillation absorption region is narrowed. In other words, the more the mass of the second moving mass 24 increases, the more the transient oscillation is absorbed in a wide region.

To increase the oscillation absorption region, the mass ratio may increase, but an inner space of the cabinet 11 on which the dynamic absorber 20 is mounted is limited. In detail, since the dynamic absorber 20 is mounted on the top surface of the cabinet 11 and covered by the top plate 12, there is a restriction that the dynamic absorber 20 infinitely increases in surface area and thickness.

Theoretically, if the mass of the dynamic absorber 20, particularly, the mass of the moving mass 21 is equal to the total mass of the laundry treating apparatus 10 on which the dynamic absorber 20 is mounted, the transient oscillation may be perfectly absorbed. However, if the mass of the moving mass 21 excessively increases, since there is a disadvantage that the load of the laundry treating apparatus 10 is excessively large, it is difficult to move and install the moving mass 21, and a drooping phenomenon due to a self-weight of the second moving mass 21 may occur. Above all, there is a limit to increase the load (or the mass) of the second moving mass 21 due to the restriction of the installation space in the cabinet 11. Also, when only the second moving mass 21 is installed, the transient oscillation may be improved, but the continuous oscillation may not be absorbed. That is, there is a limitation that one moving mass does not absorb both the transient oscillation and the continuous oscillation.

Figure 28:
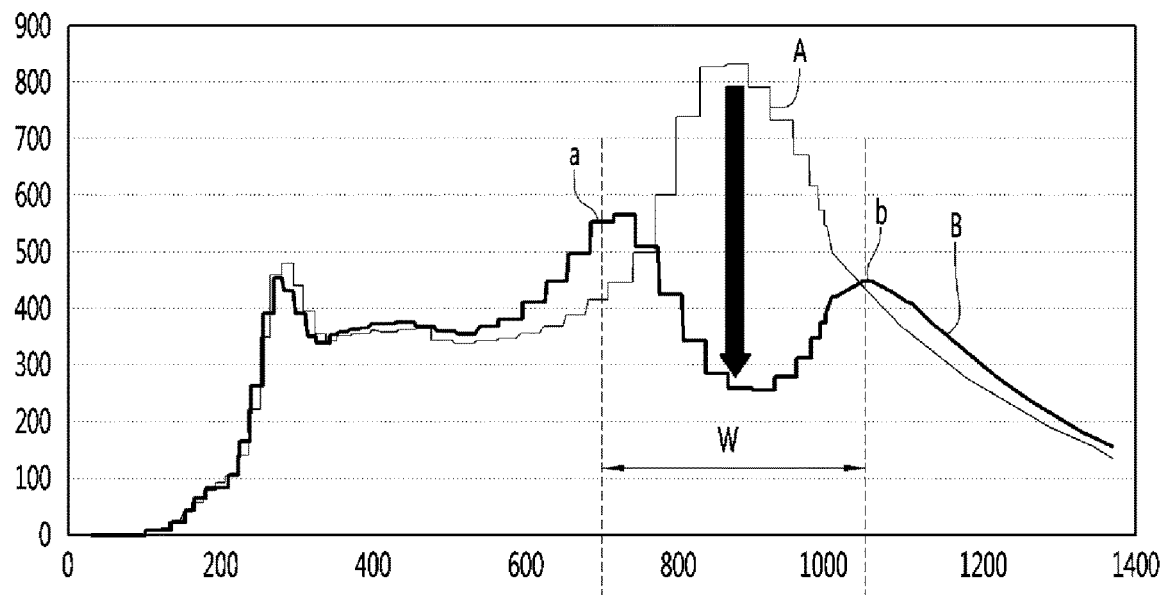
FIG. 28 is a graph illustrating oscillation displacement of a laundry treating apparatus on which a dynamic absorber including only a moving mass for absorbing transient oscillation is mounted.

FIG. 28 is a graph illustrating oscillation displacement of the laundry treating apparatus on which the dynamic absorber including only the moving mass for absorbing the transient oscillation is mounted. A horizontal axis of the graph represents the rotational speed (rpm), and a vertical axis represents the oscillation displacement of the cabinet. The rotational speed may be regarded as the same as the rotation frequency.

Referring to FIG. 28, the graph A is a graph of oscillation displacement of the cabinet measured in the laundry treating apparatus on which the dynamic absorber 20 is not mounted, and the graph B is a graph of oscillation displacement of the cabinet measured in the laundry treating apparatus on which the moving mass for absorbing the transient oscillation, which has a predetermined mass ratio.

First, a case in which the dynamic absorber is not mounted will be described. As the drum into which laundry to be rinsed or dehydrated is put starts to rotate and then increases in rotational speed, horizontal excitation force is generated by rotation of the eccentric laundry put into the drum. Also, the horizontal oscillation displacement of the cabinet increases by the excitation force. Also, when the rotational speed reaches the rotational speed of the drum, transient oscillation of the cabinet occurs by resonance. In the graph, a resonant point at which the transient oscillation occurs is determined as a range between about 800 rpm to about 1000 rpm. Also, when the rotational speed of the drum exceeds the resonant frequency, the oscillation gradually decreases. Also, the cabinet experiences the continuous oscillation in which the oscillation displacement value hardly changes in a range in which the drum is maintained at the maximum speed.

In the case in which the dynamic absorber 20 is mounted, as the drum increases in rotational speed, the cabinet 11 increases in oscillation displacement. Also, in the low-speed range in which the dynamic absorber does not start, the behavior of the oscillation displacement graph is not significantly different from the case in which the dynamic absorber is not mounted. However, when the rotation frequency (or rotational speed) of the drum falls within a frequency range at which the dynamic absorber, i.e., the moving mass starts to operate, the moving mass starts to move. As a result, the increasing oscillation displacement of the cabinet rapidly decreases, and the oscillation displacement of the cabinet, which rapidly decreases as the rotational speed of the drum increases, gradually increases again. That is, it is seen that the transient oscillation generated when the dynamic absorber is not mounted is absorbed by the dynamic absorber.

Then, when the rotational speed of the drum continuously increases, and the oscillation displacement of the cabinet increases up to a time point at which the oscillation of the moving mass is stopped, and then, the rotational speed of the drum is out of the oscillation absorption region of the dynamic absorber, the moving mass is stopped. In detail, the rotational speed of the drum exceeds the resonant frequency, the oscillation due to the excitation force is weakened, and thus, the oscillation displacement of the cabinet decreases. Thus, when the rotational speed of the drum is out of the transient oscillation absorption region of the dynamic absorber 20, the oscillation displacement of the cabinet decreases and then is maintained to the displacement in the continuous oscillation.

Here, in the graph B, it is seen that, since the transient oscillation is absorbed by the dynamic absorber 20, two inflection points a and b having an oscillation displacement less than that in the transient oscillation are formed. The oscillation at the two inflection points may be defined as secondary transient oscillation. Also, the two inflection points a and b may correspond to two peak points appearing in the response curve. A distance W between the two inflection points may be defined as the oscillation absorption region or the oscillation absorption width.

In detail, the two secondary transient oscillations may occur at each of an initial point and the last point, respectively. The front secondary transient oscillation is oscillation occurring because the moving mass absorbs the oscillation that is increasing as the moving mass starts to move. Also, the rear secondary transient oscillation is oscillation occurring because the behavior of the moving mass is stopped, and thus, the cabinet behaves under the same condition as the case in which the dynamic absorber is not mounted.

Also, when the oscillation absorption region is widened by adjusting the mass ratio, the oscillation displacement of the secondary transient oscillation may be more reduced, and the time point at which the front secondary transient oscillation occurs may be advanced to the low-speed range. Thus, stability of the washing machine may be improved when compared to the case in which the transient oscillation occurs at the high-speed range. Also, the oscillation displacement at the rear secondary transient oscillation may be controlled to be significantly lower than that at the front secondary transient oscillation by adjusting the oscillation ratio and the attenuation ration.

Here, the reason in which the two secondary transient oscillations occur is because the oscillation absorption amount is largest at the resonant point of the drum. That is, since the moving mass 21 is designed to absorb the transient oscillation as much as possible at the resonant point at which the transient oscillation occurs by allowing the moving mass 21 to maximally oscillate in the direction opposite to the oscillation direction generated by the excitation force, it is natural that the secondary transient oscillation occurs at both ends of the oscillation absorption region.

Figure 29:
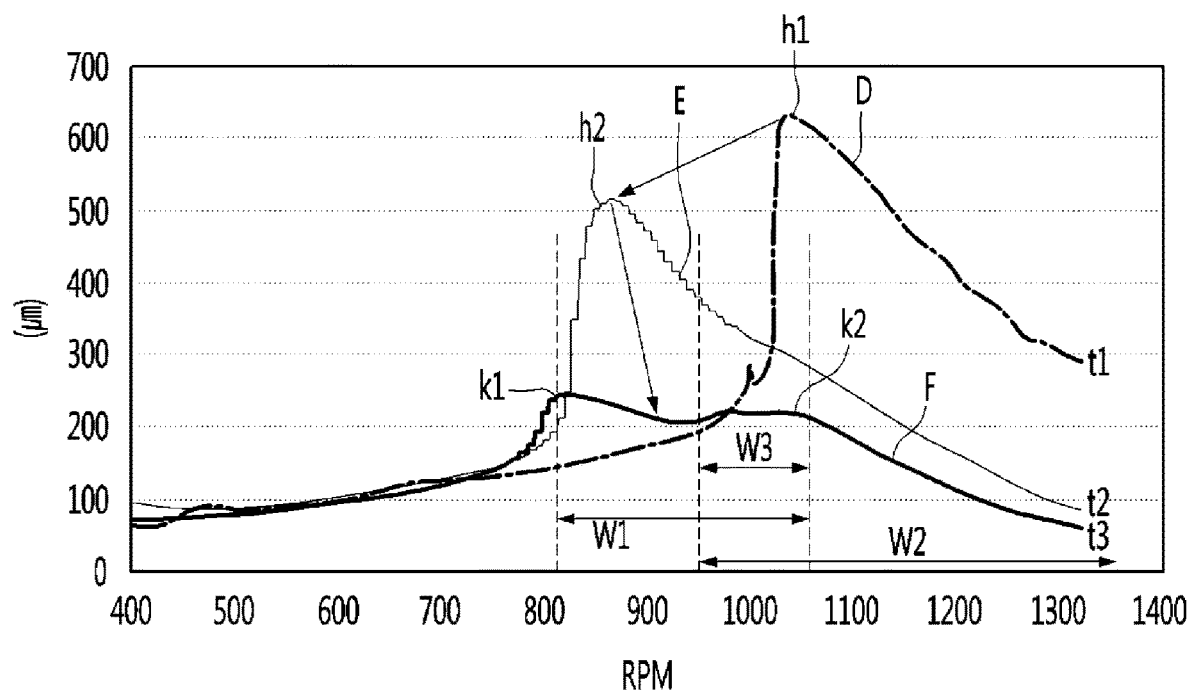
FIG. 29 is a graph illustrating oscillation displacement of the laundry treating apparatus on which the dynamic absorber is mounted according to an embodiment.

FIG. 29 is a graph illustrating oscillation displacement of the laundry treating apparatus on which the dynamic absorber is mounted according to an embodiment. In detail, a graph D is a graph showing the oscillation displacement of the cabinet according to the rotational speed of the drum in the state in which the dynamic absorber is not mounted and corresponds to the graph A of FIG. 28.

A graph E is a graph showing the vibration displacement of the cabinet when only the moving mass corresponding to the first moving mass, i.e., the moving mass for absorbing the continuous oscillation is mounted. Also, a graph F is a graph showing the vibration displacement of the cabinet when the dynamic absorber 20 according to an embodiment, i.e., both the moving mass for absorbing the continuous oscillation and the moving mass for absorbing the transient oscillation are mounted.

To design an oscillation pattern of the cabinet such as the graph E, first only the first moving mass 23 is mounted to obtain the oscillation displacement of the cabinet. That is, a mass ratio, an oscillation ratio, and an attenuation ratio of the first moving mass are adequately set in consideration of a size of the support plate 21, a distance between the support plate 21 and the top plate 12, and a desired continuous oscillation reduction amount.

Thus, the oscillation displacement of the cabinet 11 is shifted from the graph D to the graph E as illustrated in the drawing. In the graph E, it is seen that the continuous oscillation displacement is reduced by about 200 micrometers from t1 to t2 by the first moving mass. Here, it is seen that the transient oscillation displacement is reduced, although not large, by about 100 micrometers from h1 to h2 by mounting the first moving mass, and also, the transient oscillation generation point moves to the low-speed range. It is seen that the first moving mass has no major effect on the reduction of the transient oscillation because it is a main target to absorb the continuous oscillation rather than the transient oscillation.

In this state, the first moving mass 23 is included as a portion of the mass of the laundry treating apparatus, and the mass ratio, the oscillation ratio, and the attenuation ratio of the second moving mass 24 adequately change to determine an optimal mass by imputing the resultant values into the response formula. Also, when the oscillation displacement of the cabinet 11 is measured in the state in which the second moving mass 24 is mounted, the graph E is shafted to the form of the graph F.

That is, it is seen that the oscillation pattern changes from the graph D when the dynamic absorber 20 according to an embodiment is not mounted to the graph F when the dynamic absorber 20 is mounted. In the graph F, the transient oscillation occurring between about 800 rpm to about 900 rpm is absorbed by the operation of the second moving mass 24 to generate two transient oscillations having a small oscillation displacement. Also, the peak point of the rear secondary transient oscillation of the two secondary transient oscillations may be further reduced by adequately adjusting the mass ratio, the oscillation ratio, and the attenuation ratio.

Also, it is seen that the continuous oscillation is reduced from t1 to t3 by the first moving mass 23. Also, since the continuous oscillation is reduced from t2 to t3, it is seen that the second moving mass 24 contributes, although not large, somewhat to absorb the continuous oscillation.

Since the support plate on which the first moving mass 23 and the second moving mass 24 are seated is limited in size, a mass ratio of the first moving mass 23 to the second moving mass 24 has to be adequately adjusted from the maximum mass of the moving mass, which corresponds to the total size of the moving mass accommodation part 214 provided on the support plate 21. Also, since the mass of the first moving mass 23 for absorbing the continuous oscillation has to be greater than that of the second moving mass 24 for absorbing the transient oscillation, it is limited to increase the transient oscillation absorption width, which is capable of being covered by only the second moving mass 24 itself.

To overcome this limitation, the behavior region of the second moving mass 24 and the behavior region of the first moving mass 23 may partially overlap each other to allow the first moving mass 23 to partially contribute the increase of the transient oscillation absorption width. As a result, the oscillation improvement efficiency of the cabinet 11 may be maximized.

Referring to the graph 29, when the drum starts to rotate and then is gradually accelerated, the oscillation of the cabinet 11 gradually increases by the excitation force generated by the eccentric load put into the drum. Also, when the rotational speed of the drum increases somewhat (about 800 rpm in the drawings), the lateral behavior (or oscillation) of the second moving mass 24 starts. Also, the second moving mass 24 largely oscillates at the resonant point at which the transient oscillation occurs to absorb the transient oscillation. Thus, the front secondary transient oscillation (a peak point k) occurs, and the oscillation displacement of the cabinet 11 decreases and then increases again.

Here, the movement of the first moving mass 23 starts at a point at which the movement of the second moving mass 24 is ended, i.e., at a point of approximately 950 rpm in the drawing. Also, the second moving mass 24 is stopped at a range of approximately 1050 rpm to 1100 rpm, and thereafter, only the first moving mass 23 moves. Thus, the first moving mass 23 is contributed, although not large, to absorb the transient oscillation somewhat at the point at which the rear secondary transient oscillation occurs. As a result, the rare secondary transient oscillation (peak point k2) is not only disappeared almost, but also the transient oscillation area is widened.

In the drawings, W1 represents a transient oscillation absorption region (a section in which the second moving mass moves), W2 represents a continuous oscillation absorption region (a section in which the first moving mass moves), and W3 represents an overlapping region (a section in which the first and second moving masses move together).

To obtain the above-described result, i.e., the oscillation pattern of the cabinet, a design condition of the dynamic absorber 20 is set by using the response formula shown in Equation 1 above, and the dynamic absorber 20 is manufactured under the set condition to directly measure oscillation and thereby to obtain following design conditions. First, considering a design variable region for improving the continuous oscillation, the first moving mass 23 has a mass ratio of about 4% to about 10% of the mass of the drum and laundry contained therein, an oscillation ratio (or frequency ratio) of about 0.8 to about 1.5 of the RPMs of the drum, and an attenuation of about 0% to about 20% of the oscillation displacement of the laundry treatment apparatus.

When the mass ratio of the first moving mass 23 is less than about 4%, since an oscillation absorption width that is capable of being covered by the first moving mass 23 is too narrow, the overlapping region with the second moving mass 22 is eliminated to cause a limitation in which the second moving mass 22 does not help the absorption of the transient oscillation by the second moving mass 22. In addition, a limitation in which the continuous oscillation generated in the region beyond the coverable oscillation absorption region is not absorbed may occur. On the other hand, the maximum value of the mass ratio of the first moving mass 23 may be set to about 10% by an internal spatial limit of the laundry treating apparatus 10 on which the dynamic absorber 20 is mounted and the total weight limit of the laundry treating apparatus 10.

Also, since the continuous oscillation generated in the laundry treating apparatus 10 frequently occurs in a range of approximately 900 rpm to approximately 1300 rpm, the first moving mass has to be designed to absorb the continuous oscillation generated in the abovementioned region. However, when the oscillation ration of the first moving mass 23 is less than about 0.8 or exceeds about 1.5, since the target oscillation absorption region is out of the section in which the continuous oscillation is generated, resulting in a failure to absorb the continuous oscillation.

First, considering a design variable region for improving the transient oscillation, the second moving mass 24 has a mass ratio of about 2% to about 5%, an oscillation ratio of about 0.5 to about 1, and an attenuation of about 20% to about 50%. When the mass ratio of the second moving mass 24 is less than about 2%, like the case of setting the mass ratio of the first moving mass 23, the oscillation absorption width is excessively narrowed, and thus, a region in which the transient oscillation is not absorbed may occur. Also, due to the spatial limit in the laundry treating apparatus and the weight limit of the laundry treating apparatus, the maximum mass ratio has to be set to about 5% or less.

Also, the mass ratio of the second moving mass 24 to the first moving mass 23 may be set to about 40% to about 60%. It is important to adequately set the mass ratio of each of the first moving mass 23 and the second moving mass 24 in the state in which the space in the cabinet of the laundry treating apparatus 10 on which the dynamic absorber 20 is mounted is limited, particularly, an area of the support plate 21 and a distance between the support plate 21 and the top plate 12 are previously set.

When the mass ratio of the second moving mass 24 to the first moving mass 23 is set to less than about 40%, the continuous oscillation absorption capacity is improved, but the rotational speed region in which the transient oscillation is not absorbed may occur. On the other hand, when the mass ratio of the second moving mass 24 to the first moving mass 23 exceeds about 60%, the transient oscillation absorption capacity is improved, but the natural frequency of the first moving mass 23 increases due to the reduction in mass of the first moving mass 23. As a result, the frequency ratio of the first moving mass 23 increases, and the rotational speed region, in which the continuous oscillation is not absorbed because the continuous oscillation absorption region moves to a high-frequency region, i.e., the high-speed region, may occur. In addition, when the continuous oscillation absorption region moves to the high-speed region, the overlapping region in which the movement region of the second moving mass 24 and the movement region of the first moving mass 23 overlap each other may be lost.

Also, the oscillation ratio and the attenuation ratio of each of the first moving mass 23 and the second moving mass 24 may be determined by a combination of the elastic modulus and attenuation of the elastic damper 25 and the elastic modulus and attenuation of the support 28 and the slider 29. For example, the hardness (or compressive strength) of the first elastic damper 26 may be set within a range of about 30 to about 60 MPa under the condition of being manufactured in the above-described shape. Also, the hardness of the second elastic damper 27 may be set within a range of about 20 to about 50 MPa under the condition of being manufactured in the above-described shape. Also, a roller or a ball bearing may be applied to the support 28 to minimize the frictional force, and the slider 29 may generate appropriate kinetic frictional force for covering the set transient oscillation absorption region.

The laundry treating apparatus including the above-described constituents according to the embodiment has following effects. First, the dynamic absorber according to the embodiment may be provided in the laundry treating apparatus to effectively absorb the oscillation having various forms, which is generated in the cabinet of the laundry treating apparatus. That is, the moving mass for absorbing the transient oscillation and the moving mass for absorbing the continuous oscillation may be respectively provided to absorb both the transient oscillation generated in a low frequency (low-speed rotation) region and the continuous oscillation generated in a high frequency (high-speed rotation) region.

Second, since the dynamic absorber is designed so that the latter half in oscillation of the moving mass absorbing the transient oscillation and the first half in oscillation of the moving mass absorbing the continuous oscillation overlap each other, the moving mass absorbing the continuous oscillation may be partially contributed to the absorption of the transient oscillation to increase the transient oscillation absorption width. That is, it may be advantageous to reduce the oscillation displacement of the secondary transient oscillation generated in the latter half of the two secondary transient oscillations having small oscillation displacement occurring after the transient oscillation absorption.

Third, since the latter half of the transient oscillation absorption region and the first half of the continuous oscillation absorption region overlap each other, the oscillation displacement of the secondary transient oscillation may be significantly reduced, and thus, the oscillation displacement of the continuous oscillation may be reduced to improve the continuous oscillation absorption capability.

The present disclosure has been proposed to improve the above-described limitations. In one embodiment, a laundry treating apparatus includes: a cabinet; a drum accommodated in the cabinet; and a dynamic absorber provided to absorb oscillation of the cabinet, wherein the dynamic absorber includes: a first moving mass movably disposed on the support plate to absorb oscillation transmitted to the cabinet; and a second moving mass movably disposed on the support plate to absorb oscillation transmitted to the cabinet, wherein each of the first and second moving masses includes a single mass made of a metal material or a mass in which a plurality of thin metal plates are coupled to overlap each other, and the first moving mass has a mass greater than that of the second moving mass.

In another embodiment, a laundry treating apparatus comprises a cabinet; a drum accommodated in the cabinet; and a dynamic dampener provided to dampen oscillations of the cabinet, wherein the dynamic dampener includes: a first mass body provided to move relative to the cabinet to dampen first oscillations transmitted to the cabinet; and a second mass body provided to move relative to the cabinet to dampen second oscillation transmitted to the cabinet, wherein the first mass body has a greater mass than the second mass body.

In yet another embodiment, a laundry treating apparatus comprises a cabinet; a drum accommodated in the cabinet; and a dynamic dampener provided to dampen oscillation of the cabinet, wherein the dynamic dampener includes: a first mass body provided to move relative to the cabinet to dampen first oscillations transmitted to the cabinet; and a second mass body provided to move relative to the cabinet to dampen second oscillation transmitted to the cabinet, wherein a length of the first mass body in a direction of relative motion for the first mass body corresponds to a length of the second mass body in a direction of relative motion for the second mass body, and a width of the first mass body in a direction crossing the direction of the relative motion for the first mass body is greater than a width of the second mass body in a direction crossing the direction of the relative motion for the second mass body.

The details of one or more embodiments are set forth in the accompanying drawings and the description below.

Other features will be apparent from the description and drawings, and from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

What is claimed is:

1. A laundry treating apparatus, comprising:
   a cabinet including:
     a front cabinet wall;
     side cabinet walls; and
     a rear cabinet wall;
   a drum accommodated in the cabinet, a front end of the drum being configured to face the front cabinet wall, and a rear end of the drum being configured to face the rear cabinet wall;
   a support plate having side ends which are respectively connected to upper ends of the side cabinet walls of the cabinet; and
   a dynamic dampener placed on the support plate to dampen oscillations of the cabinet,
   wherein the dynamic dampener includes:
     a first mass body provided to move in a lateral direction between the side ends of the support plate and relative to the cabinet;
     a first support provided between the first mass body and the support plate;
     a second mass body provided to move in the lateral direction and relative to the cabinet; and
     a second support provided between the second mass body and the support plate,
   wherein a mass of the first mass body is greater than a mass of the second mass body, and
   wherein an attenuation of a movement of the second mass body by the second support is greater than an attenuation of a movement of the first mass body by the first support.

2. The laundry treating apparatus of claim 1, wherein:
   movement of the first mass body in the lateral direction dampens a first oscillation transmitted to the cabinet; and movement of the second mass body in the lateral direction dampens a second oscillation transmitted to the cabinet, and
   the first oscillation is generated in a first frequency region of a rotation of the drum, and the second oscillation is generated in a second frequency region of the rotation of the drum which is lower than the first frequency region.

3. The laundry treating apparatus according to claim 2, wherein an amplitude of the second oscillation is greater than an amplitude of the first oscillation.

4. The laundry treating apparatus according to claim 2, wherein a frequency of the first oscillation is greater than a frequency of the second oscillation.

5. The laundry treating apparatus according to claim 2, wherein during a time period when the drum is accelerated, the second mass body is configured to move earlier than the first mass body to dampen the second oscillation.

6. The laundry treating apparatus according to claim 2, the second frequency region overlaps the first frequency region, and both the first and second mass bodies laterally move at the overlapping region.

7. The laundry treating apparatus according to claim 1, wherein the first support includes a guide roller provided between the first mass body and the support plate, the guide roller coming into line contact with a bottom surface of the first mass body to reduce friction between the first mass body and the support plate.

8. The laundry treating apparatus according to claim 7, wherein the first support further includes:
   a roller support body mounted on the support plate to rotatably hold the guide roller, the roller support body including:
     a seating plate coupled to a top surface of the support plate; and
     a plurality of guide bosses protruding from a top surface of the seating plate.

9. The laundry treating apparatus according to claim 8, wherein a plurality of guide holes having an oblong shape are formed in the first mass body, and the plurality of guide bosses are respectively inserted into the guide holes.

10. The laundry treating apparatus according to claim 9, wherein the oblong shape of the plurality of guide holes extends in the lateral direction.

11. The laundry treating apparatus according to claim 1, wherein the first support includes a ball bearing provided between the first mass body and the support plate, the ball bearing coming into point contact with a bottom surface of the first mass body to reduce friction between the first mass body and the support plate.

12. The laundry treating apparatus according to claim 1, wherein the second support includes:
   an upper slider plate coupled to the second mass; and
   a lower slider plate coupled to the support plate,
     wherein during a motion of the second mass on the support plate, the upper slider plate frictionally moves relative to the lower slider plate.

13. The laundry treating apparatus according to claim 1, wherein a width of the first mass body in the lateral direction corresponds to a width of the second mass body in the lateral direction, and
   wherein a front-and-rear width of the first mass body is greater than a front-and-rear width of the second mass body.

14. The laundry treating apparatus according to claim 13, wherein the first mass body and the second mass body are separated in a front-to-rear direction which is perpendicular to the lateral direction.

15. The laundry treating apparatus according to claim 14, wherein the support plate includes a protrusion that extends vertically from an upper surface thereof and extends in the lateral direction to separate the first mass body and the second mass body in the front-to-rear direction.

16. A laundry treating apparatus, comprising:
a cabinet including:
  a front cabinet wall having an opening to receive laundry,
  side cabinet walls,
  a rear cabinet wall, and
  an upper cabinet wall;
a drum accommodated in the cabinet, a front end of the drum being configured to face the front cabinet wall to receive the laundry, and a rear end of the drum being configured to face the rear cabinet wall;
a support plate having side ends that are respectively connected to upper ends of the side cabinet walls of the cabinet;
a first mass body provided on the support plate to move in a lateral direction between the side ends of the support plate and relative to the cabinet;
a second mass body provided on the support plate to move in the lateral direction and relative to the cabinet;
wherein a mass of the first mass body is greater than a mass of the second mass body, and
wherein the first mass body and the second mass body are provided between the support plate and the upper cabinet wall.

17. The laundry treating apparatus according to claim 16, further comprising
a first support provided between the first mass body and the support plate; and
a second support provided between the second mass body and the support plate.

18. The laundry treating apparatus according to claim 17, wherein an attenuation of a movement of the second mass body by the second support is greater than an attenuation of a movement of the first mass body by the first support.

19. The laundry treating apparatus according to claim 16, wherein a width of the first mass body in the lateral direction corresponds to a width of the second mass body in the lateral direction.

20. The laundry treating apparatus according to claim 19, wherein a front-and-rear width of the first mass body is greater than a front-and-rear width of the second mass body.

* * * * *